(12) United States Patent
Longson et al.

(10) Patent No.: US 9,511,842 B2
(45) Date of Patent: Dec. 6, 2016

(54) TRACKING AND CHECKING COMPLIANCE OF VESSELS

(71) Applicant: Pole Star Space Applications Limited, London (GB)

(72) Inventors: Julian Longson, Farnham (GB); Ejber Ozkan, Bromley (GB); Sebastian Phelps, Chiswick (GB)

(73) Assignee: Pole Star Space Applications Limited, London (GB)

( * ) Notice: Subject to any disclaimer, the term of this patent is extended or adjusted under 35 U.S.C. 154(b) by 0 days.

(21) Appl. No.: 14/517,637

(22) Filed: Oct. 17, 2014

(65) Prior Publication Data

US 2015/0166163 A1   Jun. 18, 2015

(30) Foreign Application Priority Data

Oct. 18, 2013   (GB) .................................. 1318469.2

(51) Int. Cl.
| | |
|---|---|
| *G08B 23/00* | (2006.01) |
| *B63J 99/00* | (2009.01) |
| *G01S 5/00* | (2006.01) |
| *G06Q 10/08* | (2012.01) |

(52) U.S. Cl.
CPC ............. *B63J 99/00* (2013.01); *G01S 5/0009* (2013.01); *G06Q 10/08* (2013.01); *B63J 2099/008* (2013.01)

(58) Field of Classification Search
CPC ............................ B63J 99/00; B63J 2099/008
USPC ....................... 340/984, 870.16, 5.1, 5.2, 5.8
See application file for complete search history.

(56) References Cited

U.S. PATENT DOCUMENTS

| | | | | |
|---|---|---|---|---|
| 6,658,349 | B2 * | 12/2003 | Cline ....................... | G08G 3/00 340/992 |
| 7,747,710 | B1 | 6/2010 | Osburn, III et al. | |
| 7,889,100 | B2 * | 2/2011 | Miller ...................... | G08G 3/00 340/984 |
| 8,531,316 | B2 * | 9/2013 | Velado ..................... | B63J 99/00 340/286.02 |
| 2002/0169527 | A1 | 11/2002 | Cline | |
| 2008/0079608 | A1 | 4/2008 | Morrell | |
| 2009/0045983 | A1 | 2/2009 | Miller | |

(Continued)

FOREIGN PATENT DOCUMENTS

WO   WO 2009/009184 A1   1/2009

OTHER PUBLICATIONS

European Extended Search Report, European Application No. 14189257.0, Feb. 20, 2015, 10 pages.

(Continued)

*Primary Examiner* — Toan N Pham
(74) *Attorney, Agent, or Firm* — Fenwick & West LLP

(57) ABSTRACT

There are disclosed arrangements for tracking ships and other vessels to provide best estimate of vessel track, which can be used, for example, as part of a vessel compliance process or tool. Coordinate messages from different types of transceivers (AIS, L-band, etc.), located on board a vessel are used. A confidence level may be assigned to each coordinate message dependent on the identity of the indicated transceiver, the indicated geographical position, and other factors. Measures of performance of the transceivers may be generated and used in coordinating transceiver control.

53 Claims, 23 Drawing Sheets

(56) References Cited

U.S. PATENT DOCUMENTS

2009/0207020 A1\* 8/2009 Garnier ................ G08B 31/00
340/541
2010/0138644 A1 6/2010 Yannacone et al.
2011/0215948 A1 9/2011 Borgerson et al.
2013/0120135 A1 5/2013 Benson et al.

OTHER PUBLICATIONS

United Kingdom Search Report, GB1318469.2, Mar. 26, 2014, 5 pages.
European Examination Report, European Application No. 14189257.0, Jan. 26, 2016, 11 pages.

\* cited by examiner

Figure 5

☒ LONE STAR                                              IMO: 9626601

Port state control history check

Status: WARNING
DATE: Tue May 07 2013 16:00:21 GMT+0100 (GMT Daylight Time)

This ship was found to have deficiencies in its last Port State Control inspection.
Authority:                Paris MOU
Port of inspection:       Venezia, Italy
Date:                     04/03/2013
Ship detained?            N
No. deficiencies:         4

⤓ Full Report

Figure 7

LONE STAR                                           IMO: 9626601

Ship movement history check

Status: WARNING

Date: Tue May 07 2013 16:00:21 GMT +0100 (GMT Daylight Time)

Entered:   Departed:   Port:          Country:   Blacklisted:
12/04/2013     28/04/2013      Puerto Cabello     Venezuela      U.S. Port Security Advisory Full Report

Figure 8

| Track | ☒ |

Reference: Optional

Departure port: cape|

Departure date:
~~Cape Canaveral (United States of America USCPV)~~
Cape Charles (United States of America USCCJ)
Departure time:
Cape Cuvier (Australia AUCCU)
Cape Eleuthera (Bahamas BSCEL)
Cape Flattery (Australia AUCQP)
Interim port:
Cape Horn (Chile CLCHR)
Cape Leeuwin (Australia AUCLN)
Capelo (Portugal PTCPL)
Destination port:
Cape Palmas (Liberia LRCPA)
Arrival date:
Cape Tormentine (Canada CACTO)
Cape Town (South Africa ZACPT)
Arrival time:
Capezzano Pianore (Italy ITCPZ)

☐ Automatically de-register this ship on arrival

[ Track ]

| Acronym | Name | Spectrum (Band) | Transmitted Data | Security & Data Integrity | Remote Control | Typical Interval | Typical Cost (US$ per transmission) |
|---|---|---|---|---|---|---|---|
| AIS | Automatic Identification System | Terrestrial VHF | MMSI, IMO number, Ship type, Call-Sign, destination, coordinates from an internal GPS | No security, low integrity | no | 2-5 minutes | 0.0001 |
| S-AIS | Satellite Automatic Identification System | VHF via Low orbit satellite | MMSI, IMO number, Ship type, Call-Sign, destination, time stamp, coordinates from an internal GPS receiver | No security, low integrity | no | 15-1440 minutes | 0.0100 |
| Globalstar | Globalstar | VHF | MMSI, Time stamp, coordinates from an internal GPS receiver | No security, medium integrity | no | 60-1440 minutes | 0.0700 |
| SAT-C | Inmarsat C | L band on Inmarsat only | Equipment Identifier, time stamp, coordinates from an internal or external GPS receiver, macro encoded messages | No security, medium integrity | yes | 5-1440 minutes | 0.0800 |
| LRIT | Long Range Identification and Tracking | L Band on Inmarsat only, or VHF | Equipment Identifier, time stamp, coordinates from an internal or external GPS receiver | No security, medium integrity | yes | 15-1440 minutes | 0.0800 |

Figure 12A

| Acroymn | Name | Spectrum (Band) | Transmitted Data | Security & Data Integrity | Remote Control | Typical Interval | Typical Cost (US$ per transmission |
|---|---|---|---|---|---|---|---|
| SSAS | SSAS Third Party Integrated hardware | L band on Inmarsat only (d+) | Equipment identifier, time stamp, coordinates from an internal GPS receiver, with alert position states | Medium security | yes | 15-1440 minutes | 0.0800 |
| SSAS | SSAS Third Party Integrated hardware | L band on Inmarsat only (c) | Equipment identifier, time stamp, coordinates from an internal GPS receiver, with alert messages | Medium security | yes | 15-1440 minutes | 0.0400 |
| DSAS | Discreet Security Alert System (Pole Star) | L band on Inmarsat only (d+) | Equipment identifier, time stamp, coordinates from an internal GPS, with alert, warning and reset position states | Encrypted, high integrity | yes | 5-1440 minutes | 0.0800 |
| DSAS MK2 | Discreet Security Alert System Mk II (Pole Star) | L band on Inmarsat only (idp) | Equipment identifier, time stamp, coordinates from an internal GPS, with alert, warning and reset position states | Encrypted, high integrity | yes | 1-1440 minutes | 0.0150 |
| FB | FleetBroadband (Inmarsat) | L band on Inmarsat only | Equipment identifier, time stamp, coordinates from an internal GPS receiver | Encrypted, high integrity | yes | 1-1440 minutes | 0.0001 |
| VSAT | Very Small Aperture Terminal | C, L, Ku, Ka on multiple suppliers | Equipment identifier, time stamp, coordinates from an internal GPS receiver | Encrypted, high integrity | yes | 1-1440 minutes | 0.0001 |

Figure 12B

Date of Report: 2013-08-06 16:23:53 UTC

Ship Details:

| | |
|---|---|
| Ship Name: | GEORGITSI |
| IMO: | 9590113 |
| Call sign: | V7VY5 |
| Flag: | Marshall Islands |
| Build Year: | 2012 |
| Type: | Container Ship |
| Weight: | 44282 tonnes |

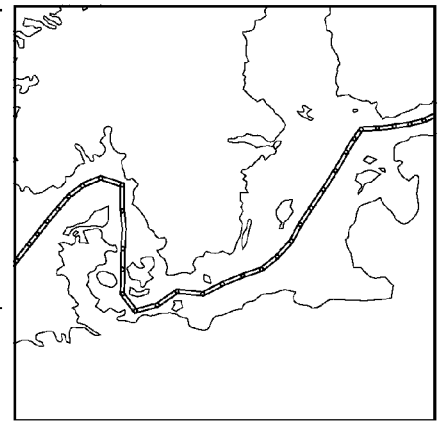

Voyage Details

| | |
|---|---|
| Trader's name: | Demo Trader |
| Reference: | REF84301 |
| Voyage Start: | 2013-07-22 16:23:47 UTC |
| Voyage End: | 2013-08-07 16:23:47 UTC |

Information provided by ⊕ POLE STAR

Screening

| | |
|---|---|
| Ship screening | 2013-08-06 16:23:47 UTC |
| Ship movement history check | CLEAR |
| Port state control history check | WARNING |
| Global sanction list check | CLEAR |

Notifications

| | | | |
|---|---|---|---|
| Ship selected for tracking | | 2013-07-27 08:23:47 UTC | CLEAR |
| Screening Complete | | 2013-07-27 08:23:48 UTC | WARNING |
| Ship Departed | Rotterdam | 2013-07-27 20:23:49 UTC | CLEAR |
| Approach to Interim Port | Felixstowe | 2013-07-28 16:23:49 UTC | CLEAR |
| Arrival at Interim Port | Felixstowe | 2013-07-29 04:23:49 UTC | CLEAR |
| Departure from Interim Port | Felixstowe | 2013-07-29 08:23:49 UTC | CLEAR |
| Approaching Destination On Schedule | St Petersburg | 2013-08-06 00:23:49 UTC | CLEAR |
| Arrival at destination | St Petersburg | 2013-08-06 12:23:49 UTC | CLEAR |
| Ship Deregistered | | 2013-08-06 16:23:53 UTC | CLEAR |

Figure 20

TRACKING AND CHECKING COMPLIANCE OF VESSELS

CROSS-REFERENCE TO RELATED APPLICATIONS

This application claims the benefit of United Kingdom application GB 1318469.2, filed on Oct. 18, 2013, and incorporated by reference herein in its entirety.

BACKGROUND

The described invention relates to methods and apparatus enabling a user to check and monitor compliance of a vessel, such as ship or other transportation asset, with compliance rules. Such compliance rules may typically implement government sanctions or similar constraints. The invention also relates to methods and apparatus for tracking such vessels. Some aspects of the invention relate in particular to the monitoring or tracking of such vessels which have a plurality of transceivers on board, each of which is arranged to transmit coordinate messages which may be used remotely to monitor the track of the vessel.

It is known to track a vessel such as a ship by locating one or more transceivers on board the vessel. Each such transceiver typically transmits coordinate messages intermittently or periodically, and these can be received remotely and analysed to derive a position or track of the vessel. Various different types of transceiver, operating using different radio frequencies, over different transmission paths and sending different information encoded in different ways are known, and it is common for a vessel to carry two or more transceivers of different types. Some types of transceivers commonly used on ships and other vessels are discussed in detail below.

It is also known to check vessels such as ships for compliance with compliance rules such as rules based on sanctions lists issued by governments and other bodies.

It would be desirable to provide improved methods and apparatus for tracking vessels carrying multiple transceivers.

It would also be desirable to provide improved methods and apparatus, for example improved computer implemented tools and associated graphical user interfaces, for enabling users having a legal or commercial interest in a vessel to monitor compliance risks.

SUMMARY OF THE INVENTION

The invention provides apparatus and methods, for example as an integrated computer implemented tool with a corresponding graphical user interface, for carrying out screening checks on vessels before deciding to track a vessel. The user may then choose to track a screened vessel, and to monitor subsequent tracking of the vessel using the computer implemented tool. The tool preferably checks the vessel against compliance rules as part of the screening checks, for example checking status of the vessel (such as ownership, flag and similar) against compliance rules representing a global sanctions list. The same or a corresponding check may also be made periodically during the subsequent period of vessel tracking, for example daily. The computer implemented tool warns the user of compliance breaches and other issues arising from the compliance rules and the vessel's status, changed status, position, track and so forth using alerts which may be presented visually on the graphical user interface, and which may also be stored reliably as part of a compliance report relating to the user's screening and monitoring of the vessel.

Accordingly, embodiments of the invention may carry out static (including legal and regulatory) checks on a vessel and parties related to that vessel such as owners and operators in the initial screening process. Embodiments of the invention may also carry out aspects of such static checks periodically (for example daily) after the initial screening process, while a vessel is being tracked during a voyage. Changes in the static status of a vessel or in other legal and regulatory matters which occur during a tracked voyage, such as changes in ownership and registration, may also be used within the compliance monitoring (risk) process as the voyage proceeds, for example in the compliance monitoring process leading to the generation of alerts and control of transceivers on board the vessel. Such changes may involve a change in the existence or size of a geographical zone relating to a change in a legal sanction affecting that vessel, but static status may also affect alert frequencies and types, thresholds and remote control instructions for transceivers and so forth.

An initial screening process before a vessel is tracked by the tracking process may include both a static check and a dynamic check. A static check could include cross checking a vessel, its owners, and related geographical based data such as countries (for example using IHS Fairplay seaweb service or one or more similar/equivalent services) against sanction data (e.g. OFAC lists in Dow Jones Risk and Compliance service or one or more similar/equivalent services). Port state control or other similar data may also be checked. The result could be represented as a static check score. A dynamic check could include cross checking both past vessel track data (for example from previous voyages) and future voyage plan data against geographical sanction data (for example zones defined using the OFAC lists), to provide a dynamic check score.

The invention also provides apparatus and methods, for example implemented as a tracking process, for tracking vessels such as ships to provide a best estimate of the vessel track (position, but optionally also speed, heading and deviation from intended course), which can for example be used in vessel tracking as part of the above compliance process or tool. The tracking process requires input, for example in the form of coordinate messages, from one or more tracking data sources, referred to herein as transceivers, which are located on board vessels. These likely include an Automatic Identification System (AIS) transceiver which sends transmissions which are then received by a coastal network, data from the same AIS transceiver received via low earth orbit satellites, and data from one or more L-band, C-band, K-band or other transceivers received via geostationary satellites, usually Inmarsat satellites. Data from more than one L-band transceiver on the same tracked vessel may be available.

Particular knowledge of the historic performance by system, make and model of a transceiver may be used to achieve more reliable vessel tracking. Transceiver specific actions taken by the tracking process including the restarting and other control options of at least some transceivers such as certain L-band transceivers.

Each transceiver on board a vessel and the associated data stream of coordinate messages received at the tracking process typically has somewhat different properties, and the invention therefore relates to the provision of preferences and decision logic which are used to select between, and combine data from, two or more transceivers for use in a process of forming a vessel track to be reported or used for other purposes, generally referred to herein as a blended track. For example, some transceivers are capable of a higher frequency of position transmissions, but provide less data security, whereas others are more secure but provide position data less frequently.

Referring to the blended vessel track arising from the vessel tracking process discussed above and elsewhere in this document, the invention also provides methods and apparatus for determining issues of risk relating to the position and progress of a vessel, including for example risks of non-compliance with compliance rules or sanctions as well as immediate risk of damage or loss of property or risk to human life. Various measures may be taken on the basis of such determinations of risk including generating alerts to bring such risks to the attention of users of the vessel tracking process, or compliance tool, to control the use of transceivers on board the vessel, and to control the tracking process, on the basis of the position and progress of the vessel and on the basis of performance of the transceivers.

The risk process and associated alerts may be based, for example, on geographically based zones, for example including core zones and peripheral buffer zones, with no alerts issued outside these zones, warning alerts in the buffer zones, and more frequent entry alerts within the core zones. More generally, the risk process may be based on predicted vessel track (heading, speed, acceleration and/or similar properties), more complex zone constructions and similar. As well as issuing alerts, certain conditions such as entering a core zone could give rise to a remote control instruction for a transmitter, for example to change its reporting rate.

A relationship between a voyage plan and the track could also be involved in the alert process. A risk model with associated parameters may be used to tune the various relationships, with the parameters being controllable by a user of the system to control alert generation.

In particular, the invention provides apparatus, or a computer implemented tool, for reporting to a user non-compliance of a vessel with a plurality of compliance rules, the tool comprising: a screening function arranged to assess compliance of the vessel with at least some of said compliance rules, for example by way of a static check, and to report resulting compliance issues to the user; and a voyage monitoring function arranged to monitor, after operation of the screening function, compliance of the vessel and a current track of the vessel with at least some of said compliance rules, for example by way of a dynamic check, and to report resulting compliance issues to the user. The screening function may assess compliance of the vessel with the compliance rules without reference to a current track or position of the vessel, that is by using a static rather than a dynamic check.

At least part of the assessment made by the screening function may be an assessment of compliance of the vessel, in combination with a prior track of the vessel, with at least some of said compliance rules. For example, the screening function may use data describing a past track, positions or locations of a ship in order to determine if compliance rules have been breached in a prior period. This could be applied using past track data over a particular prior period for which data is retained for example six months. Such data could be AIS transceiver data records which indicate positions of all vessels with such transceivers or a subset comprising vessels of interest, and the compliance check may then comprises selecting the data corresponding to the vessel in question, and comparing that AIS data or position or track data derived from that AIS data against a list of locations, geographical areas, or ports, which are considered blacklisted in the compliance rules.

At least part of the assessment made by the screening function may be an assessment of compliance of the vessel with a sanctions list, for example all or relevant parts of a global sanctions list.

The screening function may also be arranged to report to the user port checks relating to the vessel, for example to report to the user port state control reports regarding the vessel.

The voyage monitoring function may be arranged to periodically repeat at least a part of the compliance assessments of the screening function, for example daily, thereby periodically repeating some or all of the static checks of the initial screening, so that breaches of the compliance rules not specifically related to vessel track or position, such as changes of ownership or flag, are brought to the attention of the user promptly with suitable alerts.

The voyage monitoring function may also be arranged to monitor, after operation of the screening function, compliance of a current track of the vessel with the compliance rules. For example, the compliance rules may define geographical zones, entry into which comprises non-compliance with the compliance rules. Alerts may be provided to the user where such non-compliance is of increased likelihood, for example when a vessel is approaching or near to such a zone according to a particular measure of proximity.

The invention also provides apparatus such as a computer implemented tool for reporting to a user non-compliance of a vessel with a plurality of compliance rules, the tool comprising a screening function for assessing compliance of a vessel with compliance rules, the function being arranged to assess compliance, with the compliance rules, of a prior track of the vessel, and to report resulting compliance issues to the user.

The invention also provides apparatus, such as a computer implemented tool, for reporting to a user non-compliance of a vessel with a plurality of compliance rules, the apparatus comprising a voyage monitoring function for assessing compliance of a vessel with compliance rules, the function being arranged to monitor compliance of a current track of the vessel with at least some of said compliance rules, to periodically assess compliance of the vessel with at least some of said compliance rules without reference to a current track of the vessel, and to report resulting compliance issues to the user.

The invention also provides apparatus, such as a computer implemented tool, for reporting to a user non-compliance of a vessel with a plurality of compliance rules, the apparatus comprising a voyage monitoring function for assessing compliance of a vessel with compliance rules, the function being arranged to monitor compliance, of a current track of the vessel, with at least some of said compliance rules, and to issue to the user alerts in respect of resulting compliance issues.

The above apparatus and tools may also be provided with a reporting function arranged to generate a compliance report comprising compliance issues reported to the user. This report should be reliable and verifiable, so that it can be used in subsequent checks and investigations regarding previous compliance issues. For example, the apparatus or tool may be arranged such that the compliance report is always generated and stored after operation or completion of the voyage monitoring function in respect of a particular vessel. Similarly, the apparatus or tool may be arranged such that the compliance report is always generated and stored after operation of the screening function even if the voyage monitoring function is not activated for a particular screened vessel.

The invention also provides methods corresponding to the activities of the apparatus or computer implemented tool set out above, and a graphical user interface arranged to assist a user in compliance checking of a vessel against a plurality of compliance rules, the graphical user interface being arranged to provide the user with access to and/or control of the functionality discussed herein.

The invention also provides a method of tracking a vessel (or other asset as discussed more generally below) which has a plurality of transceivers located on board. This method, and aspects of this method may be used in implementing the voyage monitoring function outlined above.

In one aspect, the method of tracking a vessel comprises: receiving a stream of coordinate messages, each coordinate message defining a geographical position of the vessel and indicating that the message originates from a particular one of one of the transceivers; assigning a confidence level to each coordinate message dependent on at least one of: the identity of the indicated transceiver, and the geographical position defined by the message; and generating a track of the vessel based on the defined geographical positions and the confidence levels assigned to the associated coordinate messages.

The assigning of a confidence level to a coordinate message dependent on at least the geographical position defined by the message may comprise assigning a confidence level dependent on a relationship between the geographical position defined by the coordinate message and geographical positions defined by a plurality of previous ones of said coordinate messages, for example dependent on a degree to which the geographical position is consistent with geographical positions defined in previously received coordinate messages.

The assigning of a confidence level to a said coordinate message dependent on at least the identity of the indicated transceiver may comprises assigning a confidence level dependent on a measure of past performance of the indicated transceiver. Such a measure of past performance could, for example, include a frequency of transmission, accuracies of previous positions from that transceiver, previous needs to restart the transceiver, confidence levels assigned to previous coordinate messages indicated as received from the same transceiver, and other measures of past performance of the indicated transceiver.

Generating a track of the vessel may comprise generating the track of the vessel using geographical positions only from coordinate messages selected according to the assigned confidence levels. The track of the vessel comprises an indication of position of the vessel dependent upon time, and optionally one or more of velocity of the vessel dependent upon time and acceleration of the vessel dependent upon time. The track may be represented in various ways, for example as a series of discrete positions, or in various parameterised forms.

The method may further comprise deferring use of a first coordinate message representing an earlier geographical position in generating the track until a second coordinate message representing a later geographical position has been received. For example, a level of confidence of the first coordinate message may be low initially, and may rise when subsequent coordinate messages arrive to confirm the data provided by the first coordinate message. If the first transceiver is of a type of generally lower confidence level (for example an AIS transceiver), then the processing of the first message may be deferred until receipt of a subsequent message from a transceiver of generally higher confidence level, such as an SSAS transceiver.

According to another aspect the method comprises: receiving a stream of coordinate messages, each coordinate message defining a geographical position of the vessel and indicating that the message originates from a particular one of one of the transceivers; generating a track of the vessel using at least some of said coordinate messages; generating at least one measure of technical performance of at least one of said transceivers dependent upon said received coordinate messages; and controlling at least one of the transceivers in a manner dependent upon the at least one measure of technical performance.

Various measures of technical performance may be generated and used such as a frequency of received coordinate messages from a particular transceiver, the type of the transceiver, a recent number of required resets of the transceiver, a measure of confidence in geographical positions defined in recent coordinate messages from that transceiver.

As well as or instead of controlling the transceivers based on measures of technical performance, the method may involve defining financial costs associated with operating one or more of said transceivers, and the step of controlling may then comprise controlling at least one of the transceivers in a manner dependent upon said financial costs, as well as or instead of in a manner dependent upon measures of technical performance.

The method may further comprise defining a risk model wherein a measure of risk to the vessel. The risk model may typically define the risk to be dependent at least upon position of the vessel with respect to a plurality of geographical zones (which for example could equate to territorial waters and similar). The method may then comprise controlling at least one of said transceivers dependent upon risk to the vessel according to the risk model, for example as evaluated using the track of the vessel. The risk model may, for example, enable the method to optimise use of the transceivers to achieve or move towards a desired balance cost and risk, for example by increasing the use of transceivers which are more expensive to operate to reduce risk in geographical areas where security to the vessel is more likely to be compromised.

The step of controlling may comprise sending instructions to one or more of the transceivers, for example to change the interval between transmissions of coordinate messages of a selected one of said transceivers, to start or stop transmissions by a transceiver, to restart a transceiver, or to make a request for a contemporaneous transmission by a transceiver.

According to another aspect the method comprises receiving a stream of coordinate messages, each coordinate message defining a geographical position of the vessel and indicating that the message originates from a particular one of one of the transceivers; generating a track of the vessel using at least some of said coordinate messages; defining a risk model wherein risk to the vessel is dependent at least upon position of the vessel with respect to a plurality of geographical zones; and generating alerts dependent on risk to the vessel assessed using the model in conjunction with the generated track of the vessel in respect of said geographical position.

Risk to the vessel according to the risk model may be dependent upon one or more of position, velocity and acceleration of the vessel according to the track. The risk model may define a plurality of said geographical zones as core zones, and one or more of said geographical zones defined as buffer zones which are peripheral to ones of said core zones, the risk model defining changes of risk in respect of a vessel transitioning into a said buffer zone and in respect of a vessel transitioning into a said core zone, said changes or risk being associated with a said generation of respective alerts. Risk to the vessel according to the risk model may also be dependent upon one or more performance measures of the one or more transceivers, and may be defined such that risk to the vessel is also dependent upon legal status of the vessel including one or more of: the flag/country of registration of the vessel, the owner of the vessel, other aspects of vessel status, and prior values of these.

The invention also provides for the analysis of a past voyage using some or all of the techniques, steps and apparatus discussed herein. For example, the invention provides a method of analysing a past voyage of a vessel having a plurality of transceivers located on board the vessel, the method comprising: storing a plurality of coordinate messages transmitted by said transceivers during the past voyage, each coordinate message defining a geographical position of the vessel during the past voyage and indicating that the message originated from a particular one of one of the transceivers; and generating a track of the vessel during the past voyage using the defined geographical positions.

The method of analysis of a past voyage may further comprise assigning a confidence level to each stored coordinate message dependent on at least one of: the identity of the indicated transceiver, and the geographical position defined by the message; and generating the track of the vessel based on the defined geographical positions and the confidence levels assigned to the associated coordinate messages.

The method for analysis of a past voyage may further comprise defining a risk model relevant to the past voyage wherein the modelled risk to the vessel is dependent at least upon position of the vessel with respect to a plurality of geographical zones; forming alerts which would have been relevant to the vessel during the past voyage according to risk to the vessel assessed using the risk model in conjunction with the generated track of the vessel.

The invention also provides apparatus arranged to carry out the described methods, and in particular apparatus so arranged for tracking (or analysing a past voyage of) a vessel having a plurality of transceivers located on board the vessel, and a system comprising a vessel having a plurality of transceivers located on board the vessel in combination with apparatus arranged to receive coordinate messages from the transceivers and to track the vessel as set out above. The apparatus for receiving and processing the coordinate messages as described herein may be provided for example by a computer system or server comprising volatile memory such as RAM, non volatile memory such as hard disk drives or solid state non volatile memory, processing capabilities such as one or more microprocessors, network connection for receiving the coordinate messages and providing outputs, and suitable other arrangements for the various inputs and outputs such as one or more displays, a keyboard, mouse and other facilities as required or desired.

Preferably, at least two of the transceivers on board a particular vessel to be tracked are of different type to each other, for example with at least one of the transceivers being an AIS type transceiver, and at least one of the transceivers not being an AIS transceiver, for example being an SSAS transceiver or other transceiver operating through geostationary satellites.

The invention also provides computer program code arranged to put into effect the above methods and apparatus, when executed on suitable computer apparatus. For example, a computer system may receive a stream of coordinate messages from the vessel in real time, use these coordinate messages to track the vessel and carry out further analysis, and issue control instructions to one or more of the transceivers based at least in part on the analysis and on the received coordinate messages.

When we refer herein to a vessel, the vessel may typically be a ship or other water going craft, but the described invention and embodiments may also be applied various different kinds of assets and transportation assets, for example land vehicles such as road and rail trucks and engines, aircraft, transportation units such as cargo containers, and other assets.

BRIEF DESCRIPTION OF THE DRAWINGS

Embodiments of the invention will now be described, by way of example only, with reference to the accompanying drawings of which:

FIG. 5 shows a display of a graphical user interface of the compliance tool in which the user has access to the screening function in respect of one or more vessels;

FIG. 7 shows the graphical user interface displaying results of a port state control check of FIG. 3;

FIG. 8 shows the graphical user interface displaying results of a ship movement history check of FIG. 3;

FIG. 9 shows the graphical user interface accepting entry from a user of an expected vessel itinerary following completion of a screening check, and prior to vessel tracking as part of the voyage monitoring function for that vessel;

FIG. 10 shows the graphical user interface displaying results of on-going operation of the voyage monitoring function in respect of two different vessels being tracked;

FIGS. 12A and 12B set out some properties of various types of transceiver which could be used on the vessel of FIG. 11;

FIG. 20 illustrates a reporting output of FIG. 18;

DETAILED DESCRIPTION OF EMBODIMENTS

Figure 1:
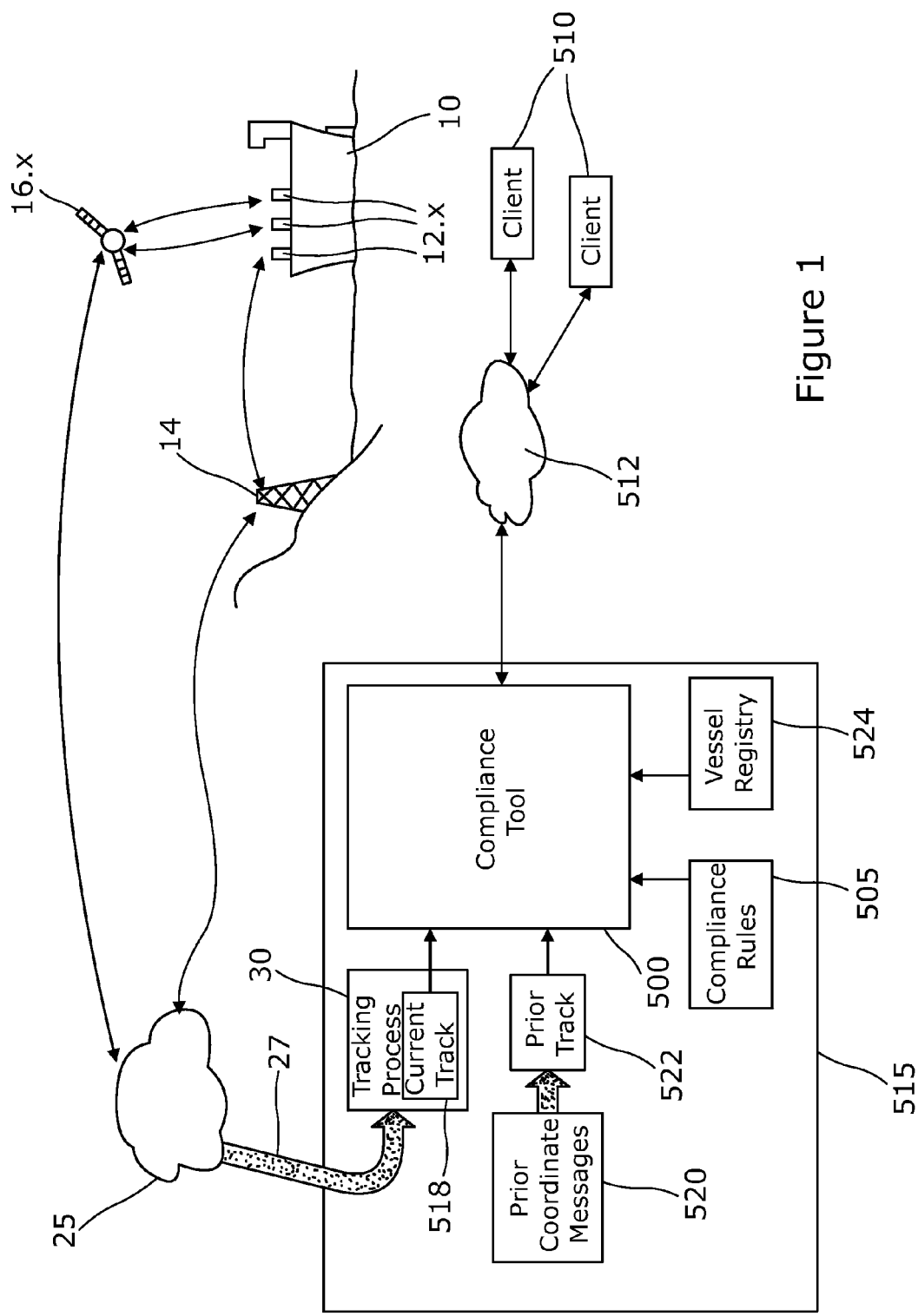
FIG. 1 illustrates a computer system providing a user with an integrated compliance tool for checking and monitoring compliance of a vessel with compliance rules.

Referring now to FIG. 1 there is shown an integrated computer implemented compliance tool 500 for enabling a user to monitor compliance, non-compliance and/or risks of non-compliance of a vessel 10 with a plurality of compliance rules 505. The compliance tool 500 may be operated by a user through a client workstation 510, which may be connected to the compliance tool 500 over a network 512, or the compliance tool 500 may execute on a client workstation 510, or may be put into effect in other suitable ways familiar to the skilled person. In any case, the compliance tool 500 may typically be implemented as one or more computer program elements executing on a computer system or server 515 comprising one or more processors, volatile memory and other usual services provided by such a computer system as will be familiar to the skilled person. The compliance tool 500 may be stored as computer program code in non volatile memory of the computer system or server 515, may be provided on one or more computer readable media, and/or may be delivered over a data or network connection to the computer system or server 515.

Various data may be available to the compliance tool in order to carry out its function. For example, in FIG. 1 a stream of coordinate messages 27 is delivered over a network 25 from one or more transceivers 12.x located on board the vessel 10, as discussed in more detail below. Some of these coordinate messages may be routed via satellites 16.x, and others via a coastal receiver network 14. The stream of coordinate messages 27 may be used by the compliance tool, or some other software running on the server 515 or on other computer apparatus, to form a current track 518 of the vessel. Previously received and/or stored prior coordinate messages 520 may similarly be used to form a prior track 522 of the vessel.

The compliance tool 500 may be used to provide end-to-end seamless compliance checking of a vessel for a period during which that user has an interest in the vessel. For example, a user of the compliance tool 500 may be a banking party involved in funding part or all of a voyage of the vessel, a commodity trading party with a legal interest in the cargo being carried on board the vessel, an insurance party involved in underwriting or insurance of the vessel and/or its cargo, or various other parties with a commercial or legal connection to the vessel. Such parties may risk or be subject to legal proceedings, monetary penalties, or other undesirable outcomes if the vessel is found to have breached sanctions or compliance rules imposed by organisations such as governments and international organisations.

Examples of sanctions which may be breached by a vessel and therefore have undesirable consequences for a party involved with that vessel may include some or all of the sanctions relevant to shipping found in the Dow Jones Risk and Compliance Service, and/or similar or equivalent services or services. Some or all of these sanctions may be encoded within compliance rules 505 available to the compliance tool 500, and may define various ways in which legal status and other aspects of a vessel can cause non-compliance with the sanctions. Some or all of the compliance rules 505 may be encoded manually or automatically from an external data supplier such as the Dow Jones Risk and Compliance Service or similar, or may be supplied directly by such a service external to the compliance tool 500.

Exemplary sanctions could prohibit commercial or legal involvement with a vessel owned by, operated by or associated with any party on a particular sanction list, or by any such party having a nationality, country of registration, or other property, or involvement with any vessel registered under any flag or being registered at a port on a particular sanction list. Such sanctions could also prohibit involvement with particular vessels, with particular classes or categories of vessel when carrying specified categories of cargo, and so forth. Legal and identity information relating to each vessel of interest may be available to the compliance tool 500 through an external service or an internal data store, represented in FIG. 1 by vessel registry 524. The vessel registry 524 may typically provide an IMO registration number for a vessel, the name, flag, registered owner and other legal and informational aspects of the vessel, for example also including but not limited to group beneficial owner, operator, port of registry, flag name, flag effective date and so forth. Typically, such information about the vessel may be provided by the commercial IHS Fairplay service, and/or a similar or equivalent service or services.

Figure 2:
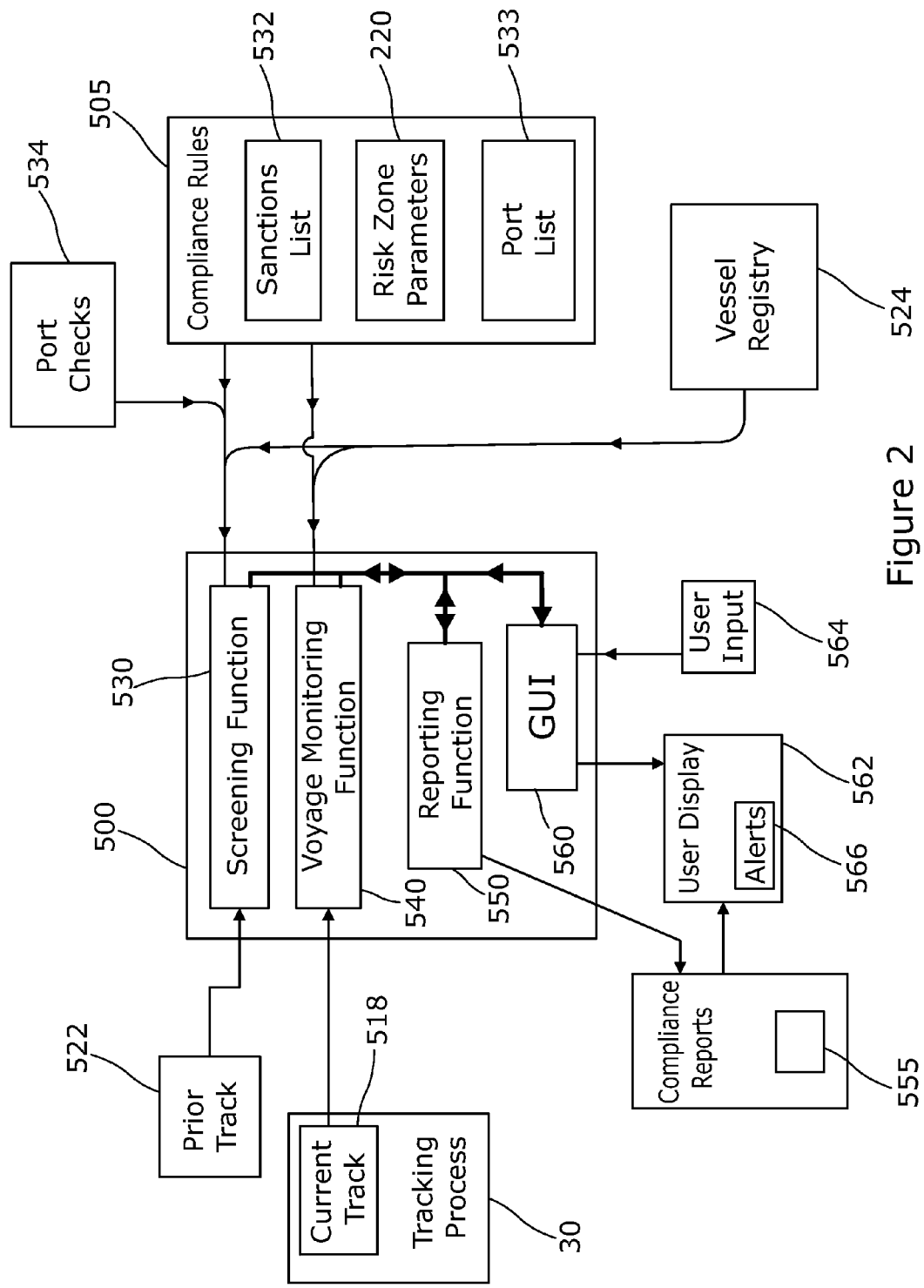
FIG. 2 shows in more detail the compliance tool of FIG. 1, including a screening function, a voyage monitoring function, and a reporting function.

FIG. 2 schematically illustrates aspects of the compliance tool 500 of FIG. 1. In particular, the compliance tool 500 provides a sequence of compliance stages for a user to follow. The first stage is provided by a screening function 530 in which the user instructs the compliance tool 500 to carry out a screening process on a particular vessel 10. The vessel for screening may be selected by the user in various ways, for example by entering an identification code (for example an IMO code) or name of the vessel, by selecting a vessel from its position marked on a map presented by the compliance tool 500 to the user, or in other ways. The screening function typically carries out its function without reference to or without monitoring a current track 518 of the vessel, although it may carry out screening checks with reference to a prior track 522 of the vessel.

When the screening stage for a particular vessel is complete, the compliance tool 500 provides the user with an option of then monitoring a progressing voyage of the vessel, through the voyage monitoring function 540. The voyage monitoring function 540 carries out its function with reference to a current track 518 of the vessel, and the compliance rules 505. The current track 518 is provided by a vessel tracking process 30, described in more detail below, which monitors position and track of the vessel, and optionally controls one or more transceivers on board the vessel to optimise the tracking process dependent on risk and cost factors, and which generates alerts and reports in respect of the tracked vessel for use by or in conjunction with the voyage monitoring function 540.

The compliance tool 500 also includes a reporting function 550 which is arranged to provide a verifiable and legally robust compliance report 555 on completed aspects of the screening function 530 and/or the voyage monitoring function 550. Typically, a compliance report 555 will be generated by the reporting function 550 when the user indicates that their requirement to continue tracking a vessel using the voyage monitoring function 540 has been met, but interim reports may be produced before this point if required, and a compliance report 555 may be generated for example in respect of operation of the screening function 530 on one or more vessels which are not subsequently tracked by the user with the voyage monitoring function 540.

The screening function 530, the voyage monitoring function 540, and optionally also the reporting function 550, interact with a user of the compliance tool through a graphical user interface 560, using one or more user display 562 and user input 564 facilities such as display screens, keyboards, pointing devices and so forth which could be provided at a client 510 as illustrated in FIG. 1. In particular, the screening function 530 and the voyage monitoring function 540 cause alerts 566 to be presented to the user, and these alerts 566 are also included in the compliance reports 555 at the same time as they are generated or subsequently.

Figure 3:
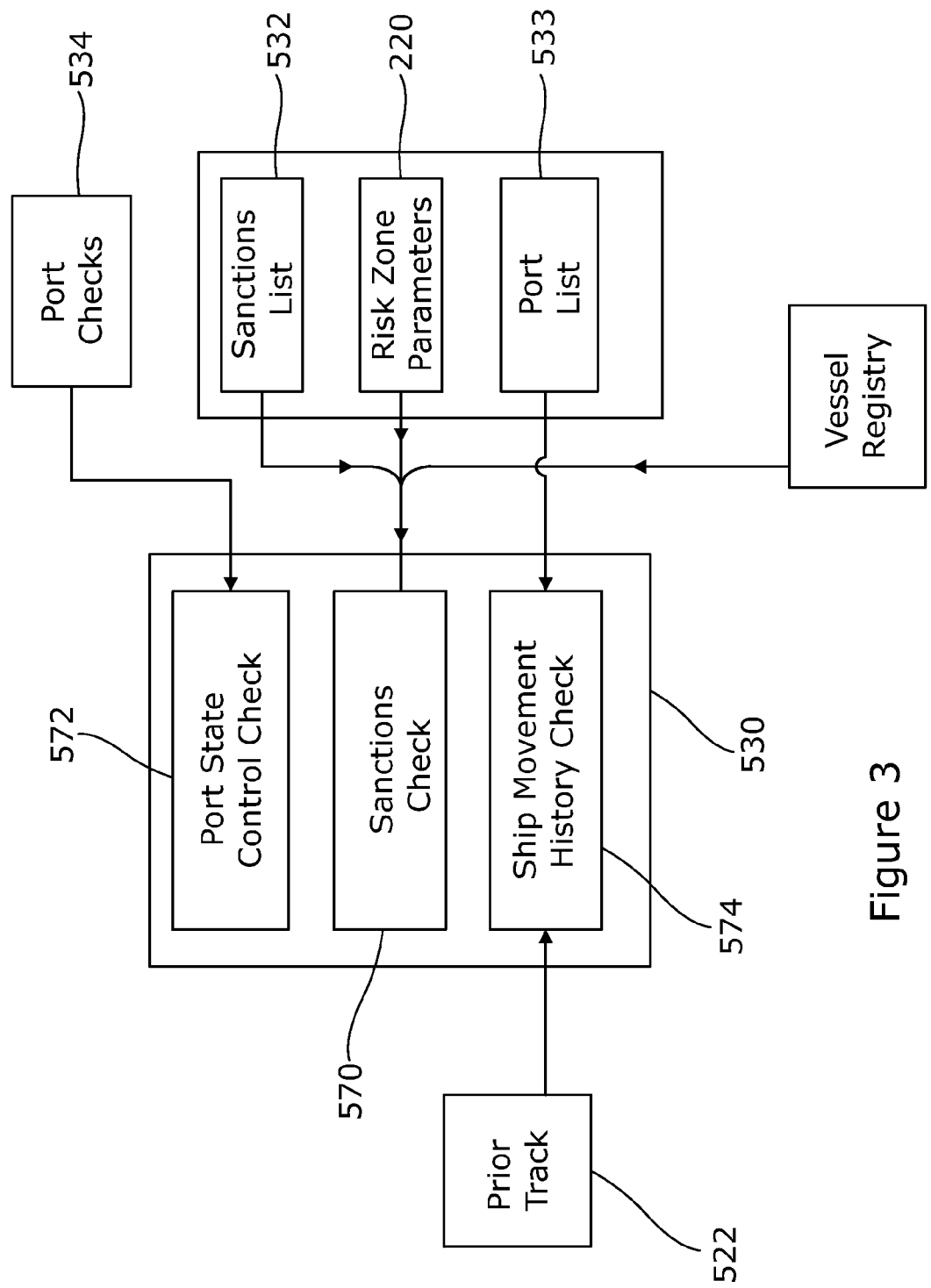
FIG. 3 shows in more detail the screening function of FIG. 2.

Further details of the screening function 530 are shown in FIG. 3. A sanctions check 570 typically makes use of at least some of the compliance rules 505, for example sanctions list compliance rules 532 derived automatically and/or manually from the Dow Jones Risk and Compliance service and/or elsewhere. In doing so, the sanctions check compares the current status of the vessel as provided by the vessel registry 524 with the sanctions list compliance rules 532, and reports resulting issues of non-compliance to the user, for example as visual or information alerts 566. Issues of non compliance may be, for example, arise when an aspect of the current status of the vessel as provided by the vessel registry 524 is stipulated as contravening a sanction coded in the sanctions list compliance rules 532.

The screening function also includes a port state control check 572 using port checks data 534 to provide the user with information on reports made by port state authorities in respect of the vessel. The port checks data 534 may be provided, for example by the port state control data commercially available from the IHS Fairplay service. Such port state control data may for example indicate that a faults or safety issues were recorded by a port state authority, or that a vessel was detained for a certain period by a port state authority.

The screening function also includes a ship movement history check 574. This check has access to prior track data 522 which defines previous movements, positions or tracks of the vessel. The prior track data 522 may be provided, for example, by position and other vessel information transmitted by an AIS transceiver on board the vessel, which may have been received and stored by the compliance tool 500 or elsewhere. The prior track data 522 may be stored in the form of received AIS data, or may be stored in various processed forms such as in consolidated vessel tracks or lists of ports called at by vessels.

The ship movement history check 574 has access to a port list 533 which forms a part of the compliance rules 505, and which specifies a number of ports and/or other geographical positions or locations against which the ship movement history check 574 compares the prior track data 522. If the prior track data 522 indicates that the vessel has called at or been within a certain distance of a port or location specified on the port list 533 then this is deemed an issue of non-compliance with the compliance rules 505 and is handled as such, for example by issuance of an alert 566 and inclusion within a compliance report 555.

Figure 4:
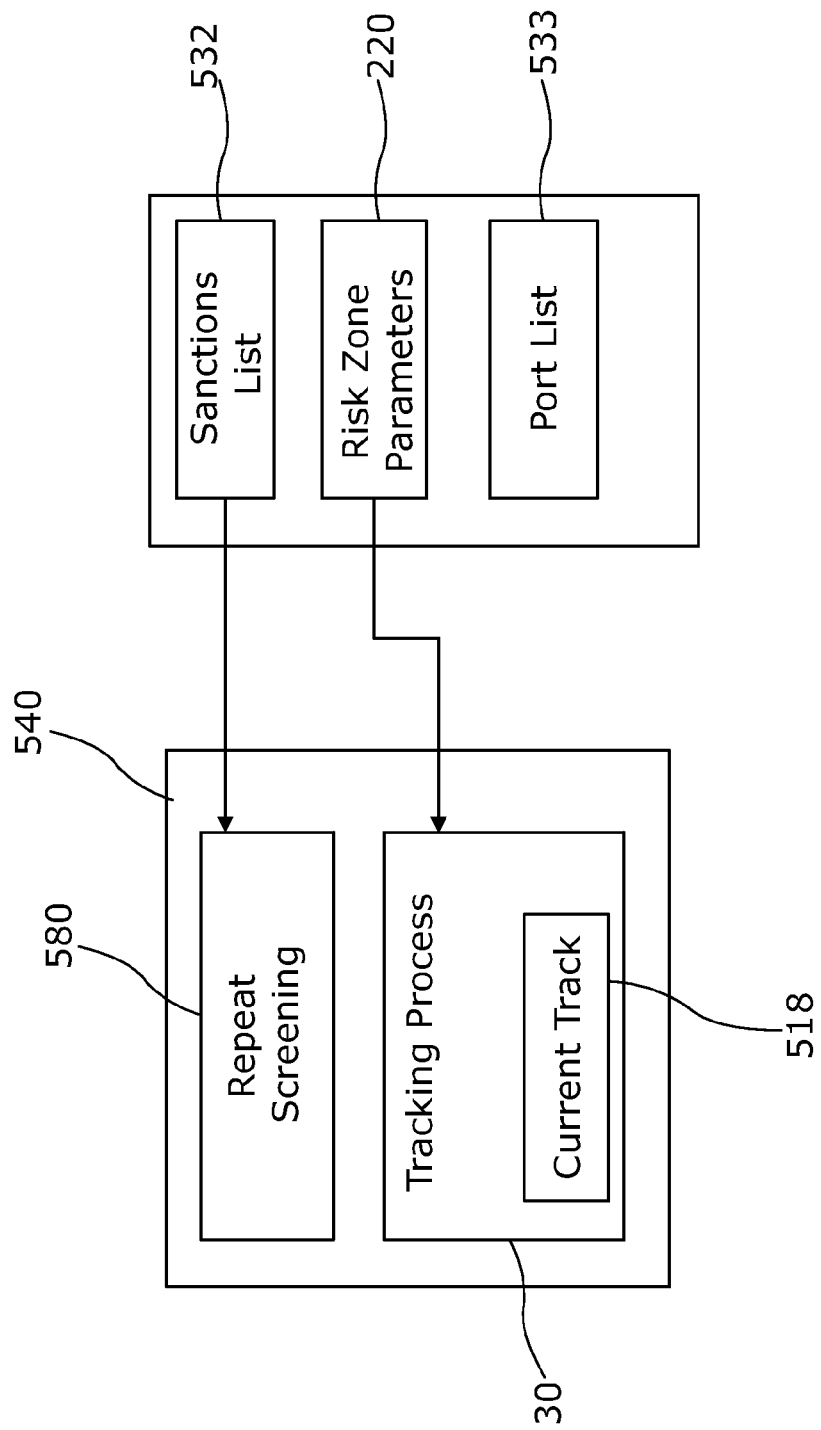
FIG. 4 shows in more detail the voyage monitoring function of FIG. 2.

FIG. 4 shows more detail of the voyage monitoring function 540 which is used to inform a user of compliance issues relating to a vessel which has already been subject to completed operation of the screening function 530 and which is now being monitored for compliance issues associated with its on-going movements. FIG. 2 illustrates the tracking process 30 which provides a current track 518 of the vessel as a separate process feeding data to the voyage monitoring function 540, but note that the tracking process 30 may also or instead be considered as part of the voyage monitoring function 540, and it is illustrated in this way in FIG. 4. Ways in which the tracking process 30 may be implemented are discussed in more detail below, but generally, given a current track 518 or position of the vessel, the tracking process 30 compares the position against at least some of the compliance rules 505, for example against risk zone parameters 220 provided as part of the compliance rules 505. Typically, these risk zone parameters define geographical zones such that a geographical relationship to these zones triggers an alert 566. Such zones could include core zones which represent the territorial waters of states entry into which may cause non compliance with the compliance rules, and buffer zones around these core zones. Ways in which the tracking process 30 may be implemented in detail are discussed below in connection with FIGS. 11-22, and the risk zone parameters 220 are illustrated particularly in FIG. 18.

FIG. 4 also shows a repeat screening check 580 which carries out repeat screening of the vessel, for example using screening functions which are the same as or similar to those of the screening function 530, on a periodic basis. For example, some or all aspects of the repeat screening check 580 may be carried our daily, or more often, and the periodicity of such checks may depend on the location of the vessel or other information relating to current risk to the vessel. In particular, the repeat screening check 580 may repeat the checks of the sanctions check 570 of screening function 530, with reference to the sanctions list compliance rules 532 as illustrated in FIG. 4.

Figure 5:
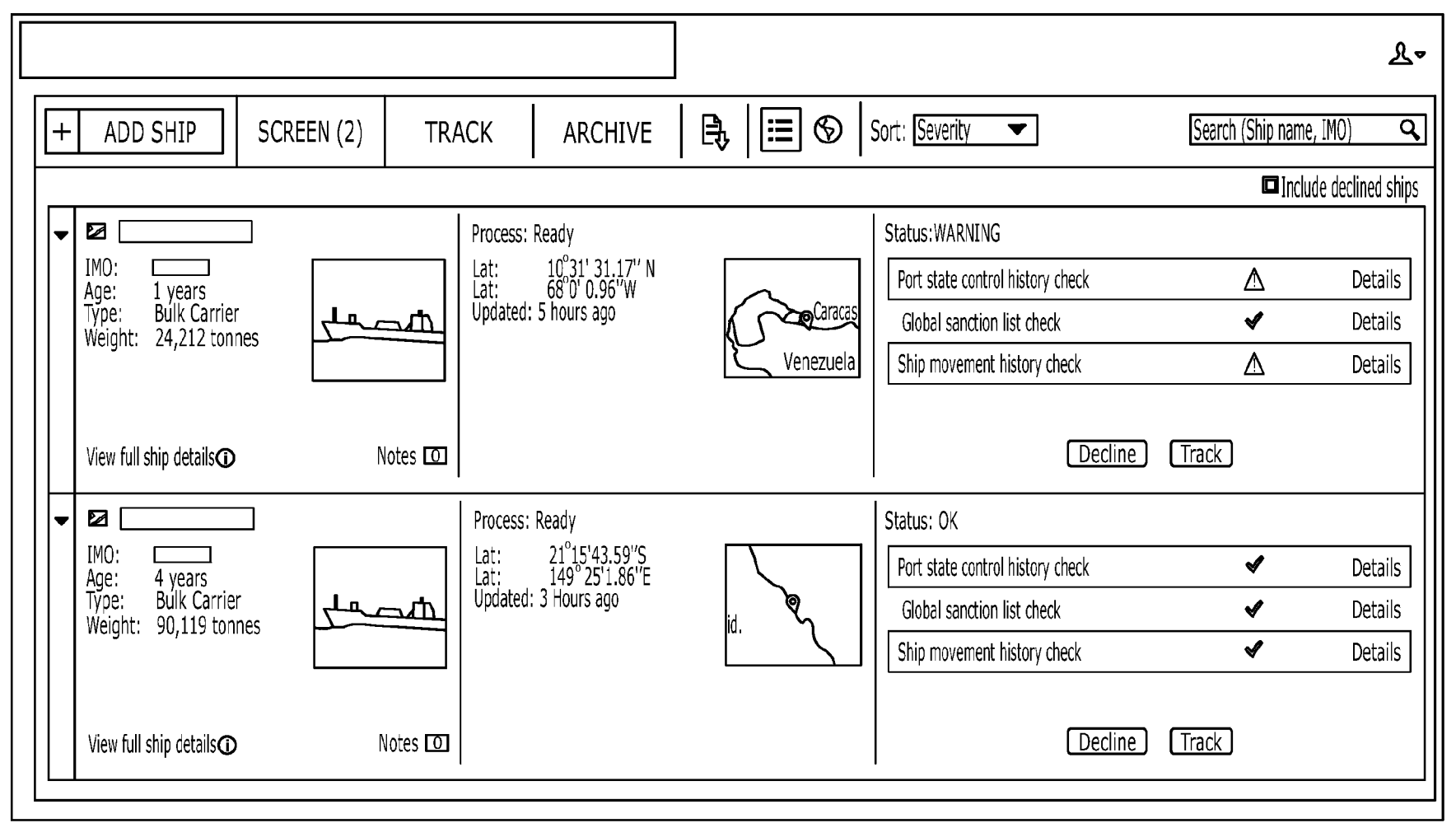

A number of aspects of the graphical user interface 560 of the compliance tool 500 will now be described in more detail. FIG. 5 shows a graphical user interface aspect of the screening function 530. According to the interface, the user is currently screening two ships. Results of the port state control check 572, the sanctions check 570, and the ship movement history check 574 are summarised for each ship on the right side of the interface, and further details of the results of these checks are available through the "Details" interface controls. Full details of each ship available in the vessel registry 524 are available through the "View full ship details" interface controls. The user can instruct the compliance tool 500 to initiate the voyage monitoring function 540 in respect of a ship using the respective "Track" user interface control, or cam remove the ship from the screening interface using the respective "Decline" control.

Figure 10:
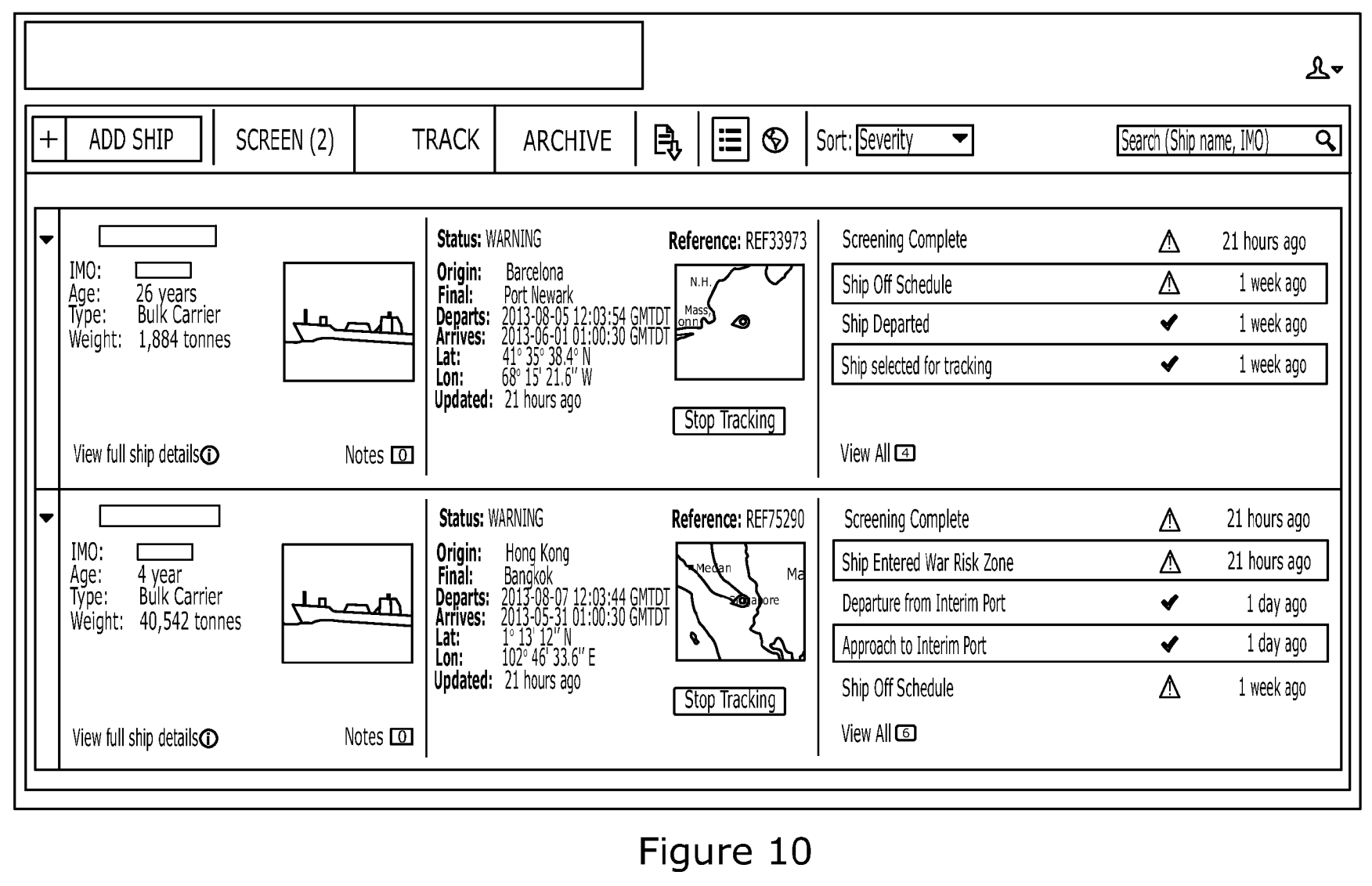

Towards the top of the interface aspect shown in FIG. 5 are multiple page tabs headed "Screen", "Track" and "Archive" enabling a user to move between the FIG. 5 interface showing currently screened vessels, the FIG. 10 interface showing currently monitored vessels, and an archive interface from which compliance reports 555 generated by the reporting function 550 can be accessed.

Figure 6:
FIG. 6 shows the graphical user interface displaying results of a sanctions check of FIG. 3.

FIG. 6 shows a further aspect of the user interface which presents results, accessible from the interface aspect of FIG. 5 using a "Details" interface control, of the sanctions check 570, in this case in respect of a particular vessel with the name MV Haadi. FIG. 7 shows a further aspect of the user interface which presents results, accessible from the interface aspect of FIG. 5 using a "Details" interface control, of the port state control check 572, in this case in respect of a particular vessel with the name Lone Star. FIG. 8 shows a further aspect of the user interface which presents results, accessible from the interface aspect of FIG. 5 using a "Details" interface control, of the ship movement history check 574.

If a user elects to track a vessel using the "track" interface control of FIG. 5, further information may be needed by the compliance tool 500 before the voyage of the vessel can be properly monitored. FIG. 9 shows a user interface aspect presented to a user after operating a "track" control of FIG. 5 which requests the user to enter details of the expected itinerary of the vessel, such as departure, interim and destination ports, and associated expected dates and times. The voyage monitoring function 540 may then be arranged to provide alerts 566 to the user if the vessel departs from the expected itinerary, or deviates from a route expected in accordance with the expected itinerary, in each case subject for example to a predetermined margin or threshold of variation from the itinerary or route. The "track" control of FIG. 9 may be used by the user to initiate the monitoring processes of the voyage monitoring function 540.

FIG. 10 illustrates an aspect of the user interface presented to the user by the voyage monitoring function 540, as reflected by selection of the "track" tab towards the top of the display. Details of two vessels which are currently being monitored are shown in the display. In respect of each vessel, a left hand panel gives brief identifying and informational details of the vessel, with a control providing a "View full ship details" function. A central panel shows the position of the vessel according to the current track 518 determined by the tracking process 30, including a small map showing this position, details of the expected itinerary and a time of last update of the current track position. A right hand panel confirms to the user when the repeat screening function 580 of the voyage monitoring function 540 of FIG. 4 was last completed, along with information relating to progress of the voyage and alerts generated by the tracking process 30 and/or the voyage monitoring process 540. In FIG. 10 alerts which are displayed include "Ship entered war risk zone" along with a time or relative time of that alert (21 hours ago in the figure).

Ways in which the tracking process 30 discussed above may operate will now be described in detail. Note that the tracking process 30 as described below may also be used for tracking vessels in contexts other than those of FIGS. 1 to 10, for example in other tools and user applications relating to vessels the position of which is periodically transmitted by one or more transceivers on board the vessel.

Figure 11:
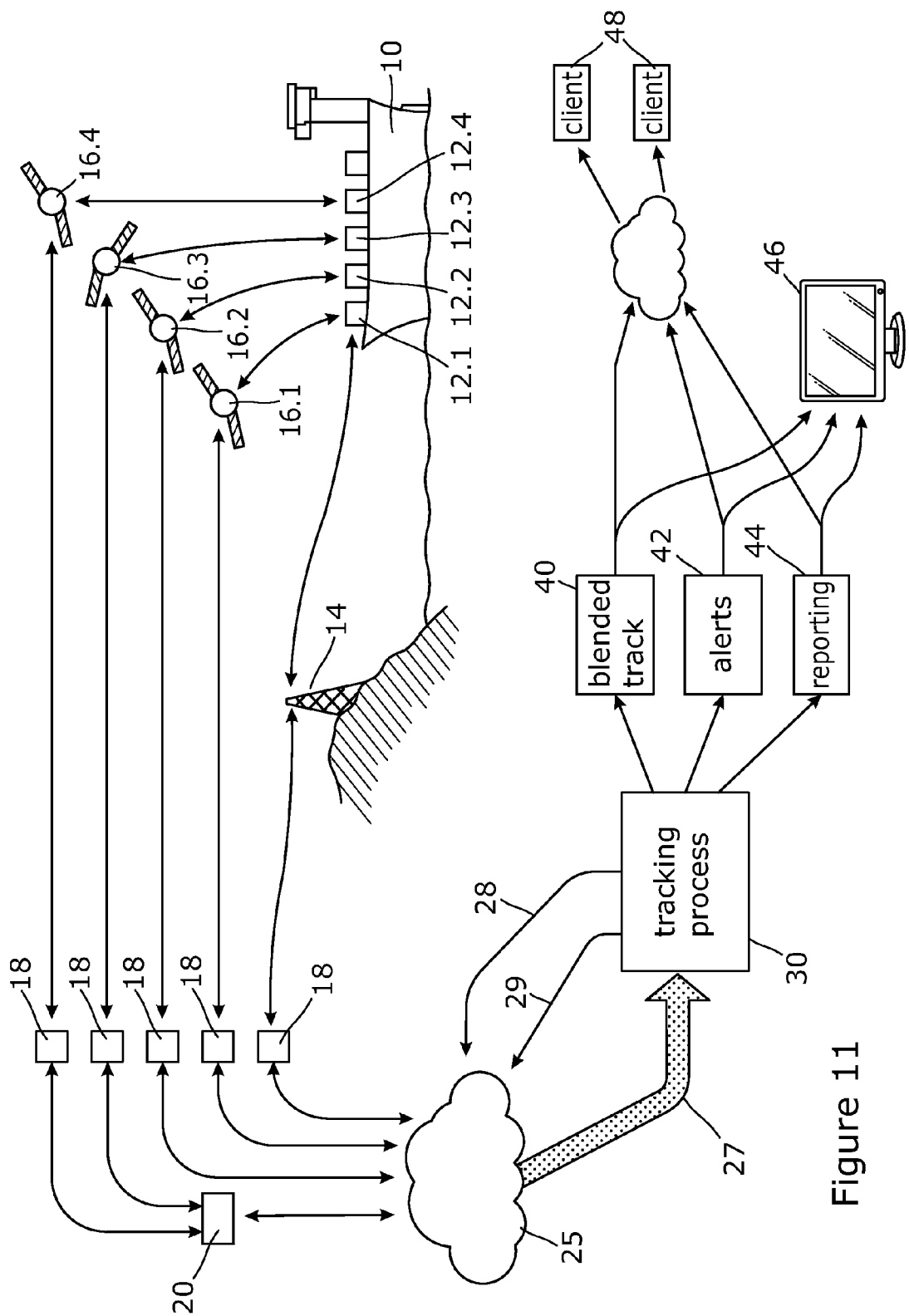
FIG. 11 illustrates schematically a ship or other vessel carrying a plurality of different types of transceiver, the transmission of coordinate messages from these transceivers via satellites and terrestrial receivers via a network to a computer based tracking process which could for example be used within or in conjunction with the compliance tool of FIGS. 1 to 10 for implementing the voyage monitoring function, and use of the output of the tracking process including control of the transceivers.

Referring therefore to FIG. 11 there is shown a system for tracking a vessel 10 such as a ship. This figure is similar in many ways to FIG. 1, but with an emphasis on the operation of the tracking functionality, rather than on the compliance tool 500 which may include or operate alongside the tracking process 30. The tracking process 30, blended track data 40, alerts 42 and reporting 44 of FIG. 11 may correspond to aspects of the compliance tool of the earlier figures. The blended track 40 may provide a current track 518 as shown in FIG. 1 and elsewhere.

On board the vessel are a plurality of transceivers 12.1-12.4. Such transceivers are known in the prior art. Each transceiver is operable to transmit periodically a signal indicating a current geographical position of the vessel. However, not all of the transceivers need be operating at the same time, and the regularity or periodicity of transmissions from particular transceivers may vary. Examples of such transceivers may be adapted to detect the vessel position autonomously for example using the GPS (global positioning system) satellite navigation system or a similar positioning system, or will be connected to a separate unit on board the vessel adapted to provide a vessel position determined in this way. However, it is possible that some transceivers could provide position information through transmitting a beacon signal which is triangulated after reception by external receivers, or using other techniques. It is also possible that some transceivers will have transmission functionality but no receiving functionality, but for consistency these are still referred to herein as transceivers, as a term of art.

Different types of transceivers which can be used on board the vessel are discussed in more detail below. However, in the example of FIG. 11, transceiver 12.1 is an AIS (Automatic Identification System) transceiver. This transmits on a VHF band which can be received by a coastal receiver network 14 if the vessel is sufficiently close to shore, and which is also received by suitably tasked low earth orbit satellites 16.1. Transceiver 12.2 is an Inmarsat-C transceiver, arranged to communicate with Inmarsat-C satellites 16.2 using a two way packet data service provided and controlled by the Inmarsat business. Transceiver 12.3 is a ship security alert system (SSAS) transceiver which typically uses an L-band or LEO (low earth orbit) satellite link. Transceiver 12.4 is a broadband satellite transceiver, typically using a C, L, Ku or Ka band satellite connection, for example operating under the FleetBroadband™ or a VSAT service.

The various periodic signals transmitted by the transceivers indicating current geographical position of the vessel are routed through one or more data handling services 18, for example including receiving downlink transmissions from satellites 16.1-16.4 and data from coastal receiver network 14, and some of the signals may be aggregated and processed in various ways, for example by one or more signal aggregator services 20. The signals indicating current geographical position of the vessel are then delivered over a network 25 to the tracking process 30 as a stream of coordinate messages 27. Each coordinate message defines a geographical position of the vessel and indicates in some way that the message originates from a particular one of the transceivers on board the vessel.

The tracking process 30 will typically be implemented on one or more server computers with suitable network connections and other i/o for communicating data as illustrated in the figures, programmed with software for putting into effect the processing aspects described herein. In the context of FIGS. 1-10, the tracking process may be implemented externally to or as part of the compliance tool 500, for example as part of the voyage monitoring function 540. Software for putting into effect the invention when executed on a suitable computer may be stored on one or more fixed and/or removable storage media, and may be transmitted over network.

The tracking process 30 is adapted to receive the coordinate messages 27 and to generate various outputs. One such output is a blended track 40 which represents an estimate of the true track of the vessel based on the received coordinate messages 27, bearing in mind that at least some of the coordinate messages 27 will be mislabelled, will define inaccurate geographical positions, will be transmitted or received only intermittently, and/or may be subject to other errors and problems. Another such output is an alert output 42 (shown as "alerts" 566 in the compliance tool graphical user interface of FIG. 2) providing an indication for example that the track of the vessel 10 indicates entry or likely entry into a high risk or sanctioned geographical area. Another such output is reporting output 44 for example to provide a summary of vessel position and related information over the course of a voyage or over a particular time interval. These and other outputs may be provided to one or more displays 46 used by an operator of the tracking process 30, and may also be provided over one or more networks to other users and clients 48. These outputs may also be provided as part of the graphical user interface of the compliance tool illustrated in FIGS. 5-10.

The tracking process 30 may also provide control of the operation of one or more of the transceivers 12.1-12.4, through a transceiver control path 28, and instructions to relevant ones of the data handling services 18 to select access to data from particular ones of the transceivers, through a transceiver data selection path 29. In this way, the tracking process may, for example, instruct the data handling services 18 and/or the transceivers themselves that signals indicating position from particular transceivers is not required or is required at a lower repeat rate, thereby saving expense in terms of fees which might otherwise be payable to the data handling services 18, or may instruct that data from particular transceivers is required at a higher repeat rate, for example to improve the accuracy of the tracking process in various ways.

The tracking process 30 will typically be tasked with tracking a large number of vessels simultaneously, and will output corresponding blended tracks 40, alerts 42 and reports 44 whenever appropriate in respect of such vessels.

FIGS. 12A and 12B provide tabular summaries of characteristics of some of the different types of transceivers and related systems which may be used in the system of FIG. 11 and other embodiments of the invention. For each transceiver type, the tables give an acronym and a more full name by which the transceiver type is typically known, and the radio spectrum or band within which it typically operates. The "Transmitted Data" columns provide lists (which may be non exhaustive) of data transmitted by transceivers of that type as periodic signals including for example MMSI (mobile maritime service identifier), IMO number (International Maritime Organisation number), ship type, call sign, destination, time stamp, and coordinates from a GPS receiver internal or external to a transceiver. The columns "Security and Data Integrity" give an indication of the extent to which the apparent identity of the transceiver and accuracy of associated data such as position can be relied upon by a receiving party, and of the extent to which third parties can eavesdrop on transmissions from the that type of transceiver. Some transceivers can be controlled remotely, for example to carry out a software and/or hardware reset, to change transmission interval and other aspects, and typically used transmission intervals for the transceiver type, in minutes between consecutive transmissions, are also shown. Finally, a typical and approximate cost of using a transceiver of the relevant type is then given in terms of the US dollar cost for each transmission of a position or coordinate message. This cost is particularly relevant for embodiments of the invention in which the use of particular transceivers on board a vessel is controlled to balance issues of cost and security/risk. Some of the various types of transceivers will now be discussed in more detail.

The first two rows of the table of FIG. 12A relate to transceivers operating in conformance with AIS, the "Automatic Identification System". AIS is a VHF based radio broadcast system. Fitment of an AIS transceiver is mandated for certain classes of ship by regulation of the International Maritime Organization (IMO). Country level maritime authorities additionally mandate fitment of AIS transceivers on additional classes of smaller craft (i.e. tugboats).

Although generally required to be operational, AIS transmissions may be suspended by the crew feel if they feel the public broadcast of their location and identify present a threat to safety—for example when transiting an area that presents a high-risk of piracy. AIS sources the ship's location from a Global Navigation Safety Service (GNSS), in practice usually the Global Positioning System (GPS) operated by the United States Government. AIS transmits via a public broadcast in the VHF frequency band, where the data feed is received by any combination of (a) other ships within the vicinity of transmission, (b) coastal receiver networks within the vicinity of transmission, or (c) space borne AIS receivers carried as payloads on commercial low-orbit satellite constellations (S-AIS).

There is no security protocol utilised by the AIS data feed. Any party which is able to receive the data feed may decode it, given access to the relevant technical standards published by the International Telecommunications Union (ITU). There is limited integrity on the ship identity information contained within the AIS data feed. Ship identification particulars (i.e. name, IMO number, Mobile Maritime Service Identify) are manually entered and sometimes found to be outdated, inaccurate or falsified. There is also limited integrity on the ship location information contained within the AIS data feed. Most equipment in service provides for an external GNSS input. As this lacks validation of the latitude, longitude or timestamp elements no assurance can be taken that these are correct.

With present technology, the temporal resolution of global AIS location services most often range from about 2 minutes to 4 hours, based on whether the ship is operating within coastal AIS range or monitored only through Satellite AIS.

The observed temporal resolution, i.e. frequency of or interval between transmissions of an AIS transceiver 12.1 on board the vessel 10, may be used as an important factor in the tracking process 30 discussed in more detail below. For example, referring to FIG. 14, the transceiver performance signal 112 fed from the message evaluator 140 to the transceivers record 110 may include observed frequency of transmission of one or more of the transceivers 12.1-12.4, and this information may be used in setting data in the transceivers record 110 relating to performance of the transceivers, such as the performance weights illustrated in FIG. 17.

The SAT-C, LRIT and SSAS rows of the tables of FIGS. 12A and 12B relate to transceivers operating according to the Inmarsat-C two-way, packet data service operated by the telecommunications company Inmarsat. Inmarsat-C hardware is typically fitted to ships to achieve compliance with the Global Maritime Distress Safety System (GMDSS), Ship Security Alert System (SSAS) and/or Long-range Identification & Tracking System regulations of the International Maritime Organization (IMO). When used in a safety capacity, pursuant to the GMDSS and/or SSAS provisions of the Safety of Life at Sea Convention (SOLAS) the transceiver must be operational at all times.

Inmarsat-C sources the ship's location data from a Global Navigation Safety Service (GNSS), in practice usually the Global Positioning System (GPS) operated by the United States Government. Inmarsat-C transmits identity and location data from ship-to-shore via an L-band omnidirectional antenna over a private data protocol specified by Inmarsat. This is known as the Polling & Data Reporting (PDR) service.

Although Inmarsat-C hardware has to pass an Inmarsat acceptance and approval process, historically manufacturers of Inmarsat-C transceivers have implemented hardware details in different ways. Each make and model of hardware may thus have undocumented characteristics that lead to varying reliability and accuracy in location reporting. Embodiments of the invention may be adapted to identify and adapt to the different configurations of hardware and transceiver tracking behaviour, for example using an automated process to obtain high quality ship tracking data from Inmarsat-C terminals. To achieve this, terminals that are not reporting correctly are identified, followed by the application of a series of technical procedures to restore proper function, for example using the transceiver controller 300 described in more detail in connection with FIG. 21 below. Such operation typically further involves managing and communicating with an Inmarsat-C transceiver in order to maintain consistent and reliable data flow. Incoming data is predominantly comprised of position reports (i.e. a packet of inbound traffic with at least an identifier, timestamp, latitude and longitude). Embodiments of the invention actively monitor these transmissions and will intervene if an Inmarsat-C transceiver ceases to conform to a required level of performance, for example by failing to make a certain number of transmissions in a given time period.

When intervening, the transceiver controller 300 may automatically generate relevant outbound traffic through control interface 305, known as commands, requesting the Inmarsat-C transceiver to perform a specific action. For example one scenario is that outbound traffic helps control the transceiver while it is moving from ocean region to ocean region (the Inmarsat-C network is split into several satellite position based ocean regions).

Each Inmarsat-C transceiver may respond to control commands differently depending on numerous variables and conditions; including the make, model and firmware version. In some embodiments of the tracking process, over forty specific behavioural variations are known to the transceiver controller 300 and are used as appropriate to restore reliable ship tracking function.

Outbound traffic commands to a transceiver involve considerably higher financial cost than inbound coordinate message data. The transceiver controller 300 described below has knowledge of the relevant costing models, and so is enabled to select the most cost effective technique(s) through which to engage with the affected transceivers.

Control of transceivers by the transceiver controller 300 can also be auto-trained by a history of prior response(s) to outbound commands through a feedback loop based on the past behaviour of the specific transceiver. Depending on the results of control signals sent to an Inmarsat-C transceiver, the transceiver may be automatically be classed by the tracking process 30, for example within the transceivers record 110, in terms of functionality and reliability. Two examples are a 'fully programmable' unit (which reports autonomously at a defined interval) and a 'Poll only' unit (requiring a separate command sent at pre-set intervals to reliably obtain the ship location).

The Inmarsat-C network uses a proprietary data protocol. This provides a moderate degree of security over the communication path, as interception is technically and logistically difficult. There is a high degree of integrity on the ship identity information, as this is transmitted via a secure protocol and the satellite network operator relies upon this data up for billing and fraud prevention purposes. There is varying integrity on the ship location information within the Inmarsat-C data feed. The transceivers record 110 discussed below may include the make and model of a transceiver, which can be used to determine whether the transceiver has an integrated GNSS receiver or relies on an external source. External GNSS location data is considered less reliable.

The temporal resolution of global Inmarsat-C location services typically range from 15 minutes to for example 6 hours, and may be remotely configured by commands sent to the transceiver, for example by the transceiver controller 300 discussed below.

The status of control, vessel location integrity and observed temporal resolution of Inmarsat-C transceivers are important aspects of the transceiver record for use in providing transceiver confidence in the tracking process, as they determine the relative weighting of the Inmarsat-C ship identification and location data in the correlated output.

The SSAS rows of the table of FIG. 12B relate to transceivers operating according to the International Maritime Organization (IMO) standards prescribed for a secure Ship Security Alert System, operating over the Inmarsat or Iridium satellite networks. SSAS hardware is fitted to ships to achieve compliance with the Ship Security Alert System (SSAS) requirements. A subset of this hardware provides additional security functions, which distinguishes the operation of the equipment in the SSAS rows of FIG. 12A from the Globalstar, SAT-C and LRIT rows. Subject to the Safety of Life at Sea Convention (SOLAS), the SSAS transceiver must be operational at all times the ship is underway.

SSAS sources the ship's location data from a Global Navigation Safety Service (GNSS), in practice usually the Global Positioning System (GPS) operated by the United States Government. Secure SSAS transceivers transmit identity and location data from ship-to-shore via an L-band omnidirectional antenna over a private data protocol specified by Inmarsat; on the Inmarsat-D+, Inmarsat-IsatM2M or Inmarsat Data Pro (IDP) services.

Secure SSAS equipment incorporates a number of specific features including, tamper resistant construction, GPS "jamming" detection and countermeasures, an internal backup battery for continued operation in the event of failure of the ship's main power, and a tamper detection switch if the transceiver case is opened.

The SSAS transceiver may be remotely interrogated to obtain its status, for example battery voltage and condition, to obtain a current position report, or alter the interval of automatic position reporting.

The Inmarsat-IsatM2M or Inmarsat-IDP network uses a proprietary encrypted data protocol. This provides a high degree of security over the communication. There is a high degree of integrity on the ship identity information, as this is transmitted via a secure protocol and the satellite network operator relies upon this data up for billing and fraud prevention purposes. All transceivers of this class include an integrated GNSS, contributing to the reliability of ship coordinates received from this source.

The temporal resolution of global SSAS location services ranges from 1 minutes to 24 hours, and may be remotely configured by commands sent to the transceiver, for example by the transceiver controller 300 discussed below.

The status of control, vessel location integrity and observed temporal resolution of SSAS transceivers are important aspects of the transceiver record for use in providing transceiver confidence in the tracking process discussed below, as they determine the relative weighting of the SSAS ship identification and location data in the correlated output.

The "FB" and "VSAT" rows of the table of FIG. 12B relate to transceivers providing a broadband Internet (TCP/

IP) service, operating over the Inmarsat, Intelsat or other suitable satellite networks. Services are commercially available at present on the C, L, Ku and Ka bands; with the possibility of other bands being utilised in future. Coverage may be regional, or global in nature (dependant on the specific service).

There is no regulatory requirement that requires the fitment, or operation, of this class of transceiver; however ships often have the equipment fitted voluntarily to facilitate ship-to-shore and shore-to-ship communication by supporting exchange of email, internet access and voice-over-IP (VoIP) services. A subset of this hardware provides high resolution tracking functions.

Broadband transceivers source the ship's location data from an integral Global Navigation Safety Service (GNSS), in practice usually the Global Positioning System (GPS) operated by the United States Government. Secure SSAS transceivers transmit identity and location data from ship-to-shore via a directional gyro-stabilised directional antenna or software steerable phased array antenna, over a private data protocol specified by Inmarsat, Intelsat or the other satellite network or virtual network operator of the user's preference.

The Broadband transceiver may be remotely interrogated to obtain a current position report, or alter the interval of automatic position reporting.

The FleetBroadband and other VSAT networks use proprietary encrypted data protocols, defined by the relevant network operator. This provides a high degree of security over the communication. There is a high degree of integrity on the ship identity information, as this is transmitted via a secure protocol and the satellite network operator relies upon this data up for billing and fraud prevention purposes. All transceivers of this class include an integrated GNSS, contributing to the reliability of ship coordinates received from this source.

The typical temporal resolution of Broadband location services ranges from around 1 second to 24 hours, and may be remotely configured by commands sent to the transceiver, for example by the transceiver controller 300 discussed below.

The status of control, vessel location integrity and observed temporal resolution of Broadband transceivers are important aspects of the transceiver record for use in providing transceiver confidence in the tracking process, as they determine the relative weighting of the SSAS ship identification and location data in the correlated output.

Figure 13:
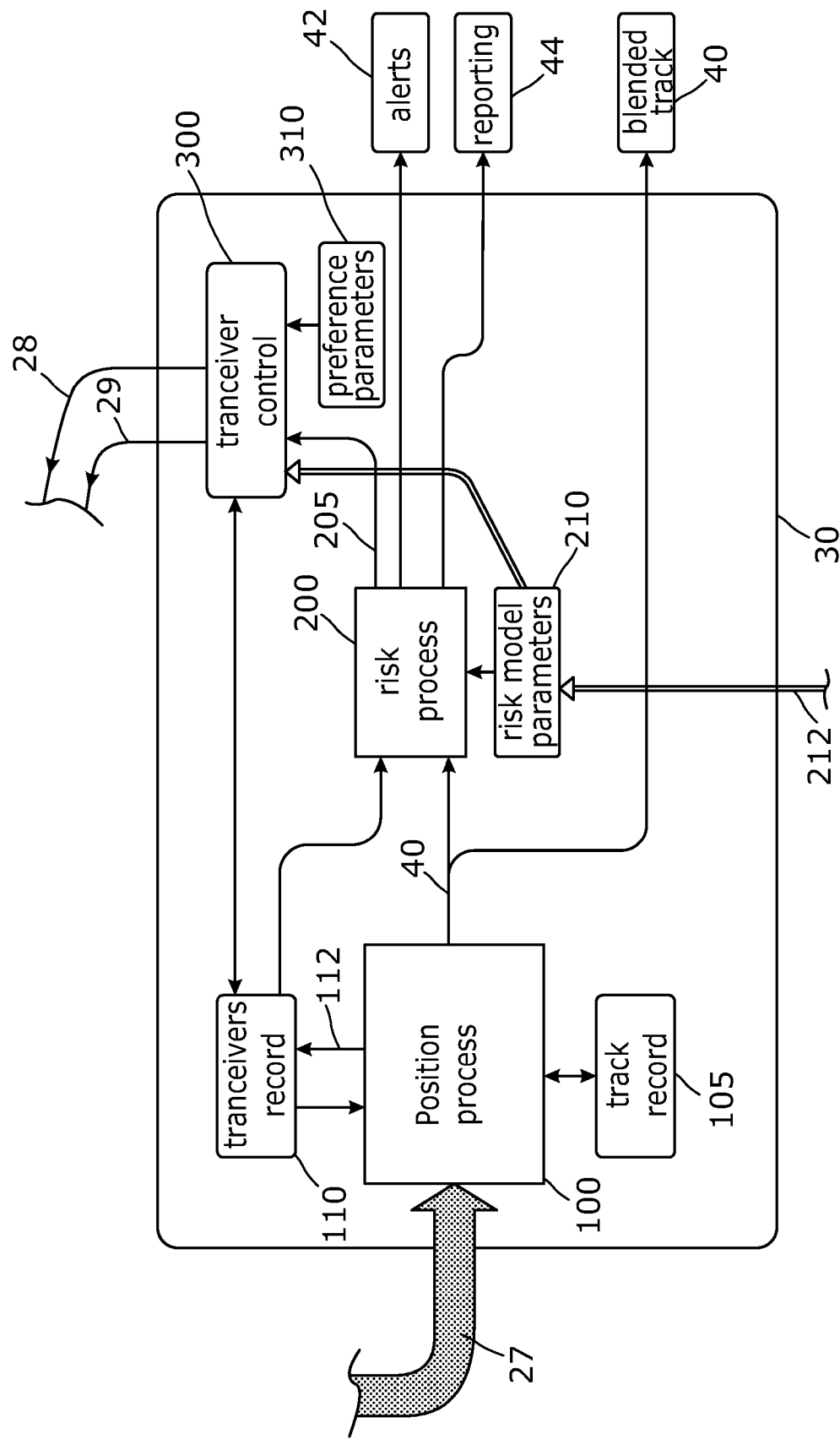
FIG. 13 illustrates in more detail how the tracking process of FIG. 11 maybe implemented to provide a vessel track, alerts, reporting, and control of the transceivers.

FIG. 13 illustrates schematically some main processes of the tracking process 30. The coordinate messages 27 are received at a position process 100 which generates the blended track 40 from these messages. The position process 100 generates and uses as part of its operation a track record 105 which includes data from the received coordinate messages 27, data relating to assessments by the position process 100 of particular coordinate messages, and other data. The position process 100 also passes information determined from the received coordinate messages 27, such as indicators of performance and reliability of particular ones of the transceivers 12.1-12.4, to transceivers record 110, which also contains other data relating to the transceivers, and the position process 100 also uses such data as part of its operation.

The blended track 40 is also passed to a risk process 200 which makes assessments of risk to the vessel based on the blended track 40 with reference to risk model parameters 210, and outputs a risk signal 205. The risk model parameters 210 may include information relevant to risk to the vessel and compliance with law and procedure, such as details of geographical zones, countries and ports with associated risk factors, and legal issues such as embargoes, information relating to the ownership, and flag of a vessel. Such risk model parameters are changed periodically to reflect changes in compliance and risk issues using external input 212, and will be described in more detail below. Outputs from the risk process 200 include alerts 42 and reporting 44 outputs already mentioned above.

Consequently, it will be understood that the risk signal 205 and other aspects and outputs of the risk process 200 may relate to various types of risks associated with the vessel 10 including, for example, risk that the vessel will enter a geographical zone which national laws or embargoes forbid it from entering, risk that the vessel will be subject to attack or other breaches of security, risk that the vessel will experience operational difficulties for example due to sea conditions, navigational issues and so forth.

Outputs from the risk process are also used to control a transceiver control process 300 which provides control of the operation of one or more of the transceivers 12.1-12.4, through a transceiver control path 28, and instructions to relevant ones of the data handling services 18 to select access to data from particular ones of the transceivers, through a transceiver data selection path 29, as mentioned above. The transceiver control process also receives information relating to the transceivers, for example information relating to transceiver performance and reliability derived by the position process 100, from transceivers record 110, and provides information to the transceivers record 110, for example specifying current operational parameters such as transmission interval.

The transceiver control process 300 operates using data found in transceiver control preference parameters 310 which may specify, for example, a monetary cost of using particular ones of transceivers 12.1-12.4 at particular transmission intervals or duty cycles, and a required or target current risk/monetary cost balance. The transceiver control process 300 also has access to the risk model parameters 210 to enable it to determine what transceiver control measures will give rise to suitable changes in risk and cost for example to meet a target risk/cost balance.

Figure 14:
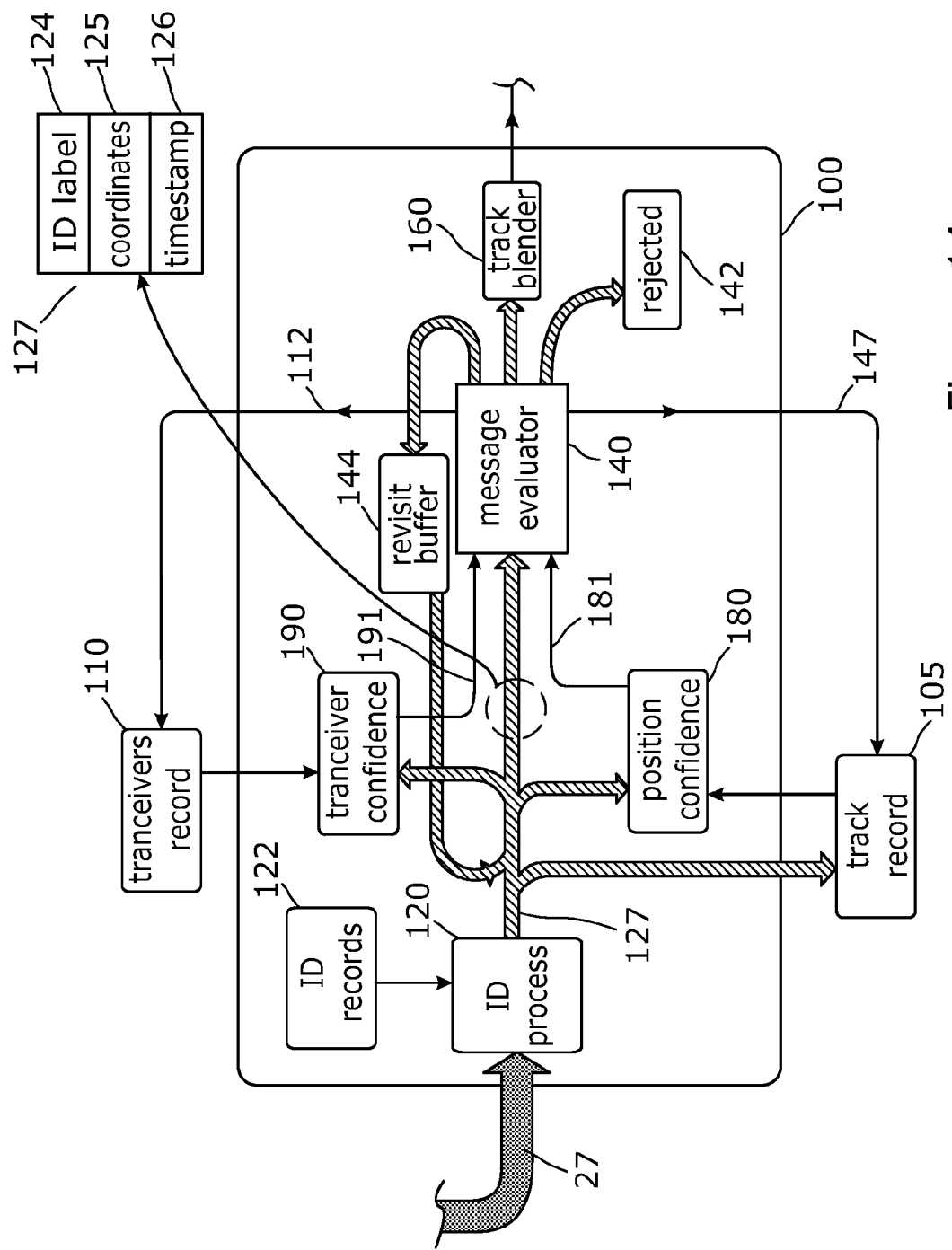
FIG. 14 shows in more detail how the position process of FIG. 13 may be implemented to provide a vessel track and other outputs.

FIG. 14 illustrates in more detail aspects of the position process 100 which work together to output a blended track 40 on the basis of the received coordinate messages 27. An identification process 120 parses the received coordinate messages with reference to identification records 122 to output a stream of processed coordinate messages 127 relating to a single particular vessel 10. Each processed coordinate message in this stream carries, in a consistent form, an ID label 124 identifying the transceiver 12.1-12.4 from which the geographical position appears to have been sent. The identification records may, for example, map particular instances of the MMSI (mobile maritime service identifier) and other identifiers typically used in coordinate messages received in the stream 27, to particular vessels which are of interest to the tracking process 30, and to particular transceivers 12.1-12.4 located on board those vessels. The identification process 120 also maps geographical positions included in the coordinate messages received in stream 27 to coordinates 125 in a consistent form for use by the position process 100, and the time at which the message indicates those coordinates of the vessel in a standard form as timestamp 126.

Typically, all the processed coordinate messages 127 are stored in the track record 105. Each processed coordinate message 127 is also passed to a message evaluator 140 which assesses whether a particular coordinate message 127 should be passed to a track blender 160, should be rejected 142 or should be considered for use later by passing to revisit buffer 144 where the processed coordinate message 127 is delayed before being reintroduced to the message evaluator at a later time. The decision of the message evaluator 140 can be made on the basis of various criteria, but in the arrangement of FIG. 14 the decision is made on the basis of a position confidence measure 181 received from a position confidence function 180 and a transceiver confidence measure 191 received from a transceiver confidence function 190.

Relevant data from the evaluation process carried out by the message evaluator 140 are sent in transceivers record updates 112 to be combined into the transceivers record 110 which stores information about the performance of particular transceiver units 12.1-12.4 on board the vessel. This information is then also used by the transceiver confidence function 190. Similarly, relevant data from the evaluation process carried out by the message evaluator 140 are also combined into the track record 105 with an association with the corresponding processed coordinate messages.

A processed coordinate message 127 may be delayed using the revisit buffer 144 for a variety of reasons, for example because the message has been received out of order before expected messages representing the position of the vessel at an earlier time, or because later data from a more reliable transceiver is needed before the delayed message can be properly evaluated.

The track blender 160 may be designed with various levels of complexity according to need. At a simple level, the track blender 160 may output in a suitable form each coordinate 125 and timestamp 126 of each processed coordinate message 127 accepted for the blended track by the message evaluator 140. At a more complex level, the track blender 160 could generate track parameters, for example defining best fit curves of position over time in concatenated segments, so that an estimate of position, and optionally also of velocity and acceleration at any particular point in time can be easily calculated, and/or so that a track curve can be easily plotted.

Figure 15:
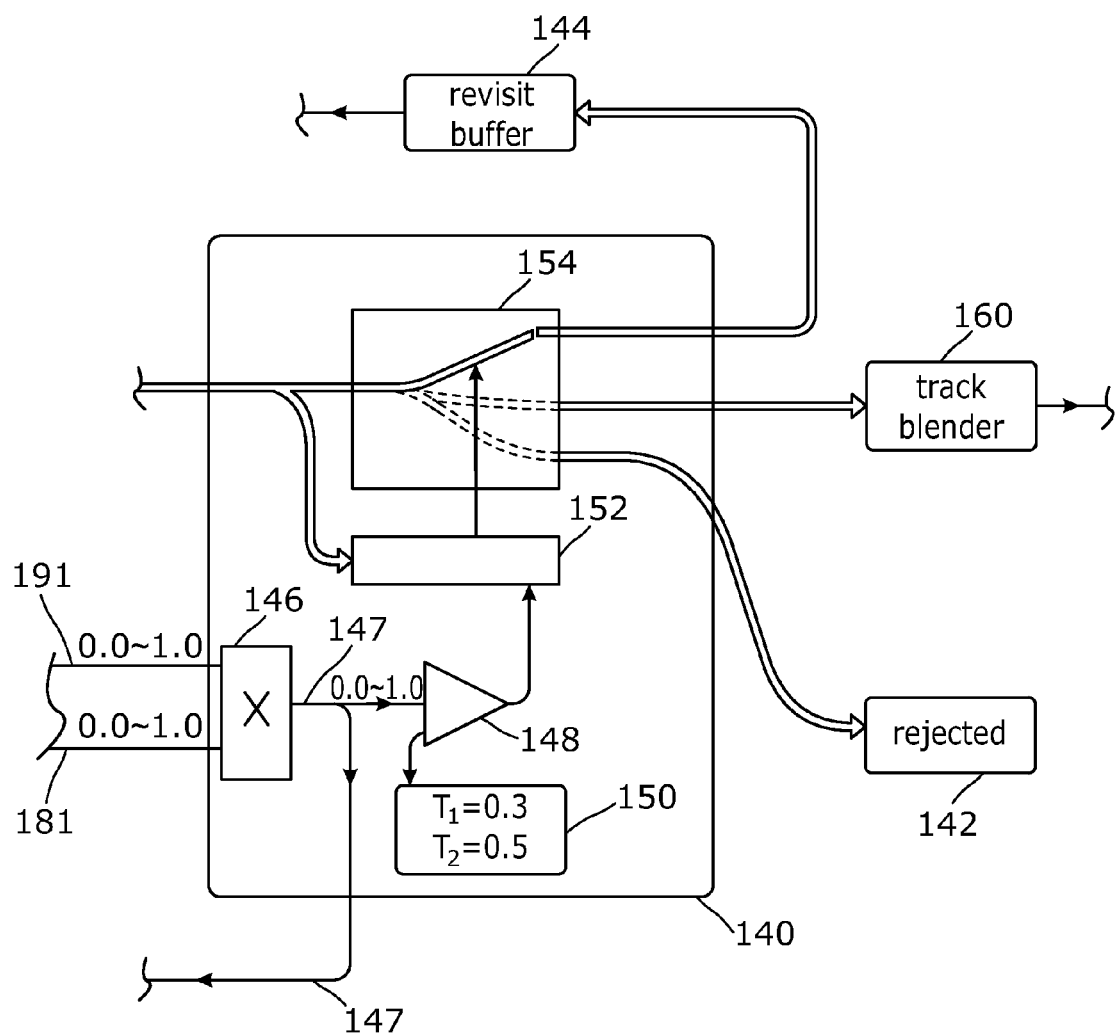
FIG. 15 shows in more detail how the message evaluator of FIG. 14 may be implemented.

According to one example as illustrated in FIG. 15, each of the position confidence measure 181 and the transceiver confidence measure 191 may take a value ranging from 0.0 to 1.0. The message evaluator 140 may then include a combined confidence function 146 which combines the confidence measures for example by multiplying them together, or using some other function, to yield a combined measure of confidence 147 in a particular processed coordinate message which is also a number ranging from 0.0 for no confidence to 1.0 for full confidence. A comparator 148 then decides whether a particular processed coordinate message 56 should be rejected 64, passed to the revisit buffer 66 or passed to the track blender 160 based on thresholds 150 applied to the single numerical measure of confidence. FIG. 15 shows associated thresholds of less than 0.3 for rejection, between 0.3 and 0.5 for buffering, and greater than 0.5 for accepting into the blended track, but of course other values could be used.

An ordering function 152 receives the control signal from the comparator 148, and is additionally able to decide if a coordinate message should be sent to the revisit buffer because other coordinate messages are required before a proper assessment or best use of the currently considered coordinate message can be made. The ordering function 152 sends an instruction to switch 154 to route the coordinate message 127 to either the revisit buffer 144, the track blender 160 or for rejection 142. Logic on which the ordering function 152 may decide that a coordinate message should be sent to the revisit buffer because other messages are required before a proper assessment can be made could be, for example, to delay processing of coordinate messages from a lower accuracy or reliability source (e.g. AIS) until or pending processing of a subsequent coordinate message from a higher accuracy or reliability source (e.g. SSAS). The ordering function 152 may also cause a coordinate message which has been evaluated for rebuffering more than once according to the thresholds 150 to be rejected.

Other ways in which the evaluation function may work include using only either a position confidence measure 181 or a transceiver confidence measure to make the evaluation of a coordinate message, not using any sort of delayed processing such as the described revisit buffer, using fuzzy logic or more complex decision schemes to make the evaluation of a coordinate message, and so forth.

Figure 16:
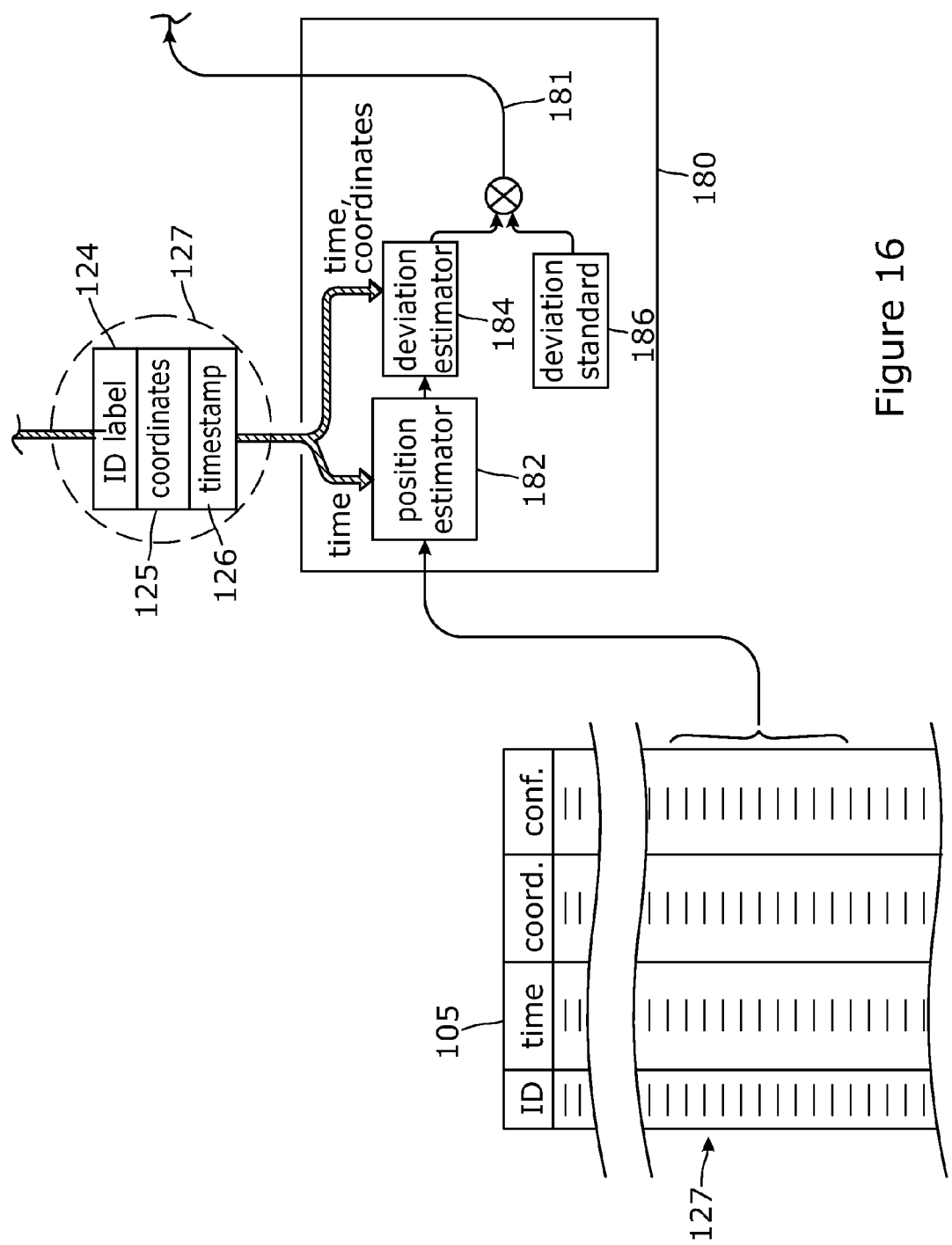
FIG. 16 shows in more detail how the position confidence process of FIG. 4 may be implemented.

An example of how the position confidence function 180 may be implemented, with reference to the track record 105, is presented in FIG. 16. The track record 105 is shown as a table which includes four data items (set out in the table as four columns) in respect of each processed coordinate message 127 already received at the tracking process 30 and recorded in the track record 105. These are an identifier (ID) of the transceiver 12.1-12.4 which appears to be the source of the coordinate data, a time stamp ("time") for the geographical position of the vessel, the geographical position itself ("coord.") and a measure of confidence in the data ("conf."). The first three data elements are provided by the original coordinate message 27. The measure of confidence may be the combined measure of confidence 147 when it has already been calculated for that processed coordinate measure 127 by the message evaluator 140, or a default value if no such measure has yet been calculated. The measure of confidence could be represented, for example, by numbers in the range from 0.0 to 1.0 with 0.0 indicating a minimum level of confidence and 1.0 a maximum level.

The position confidence function 180 receives a processed coordinate message 127, and assesses a degree of fit of the timestamp and coordinates in the received message with the data in the track record. This could be done for example using a Kalman filter with a suitable model of vessel dynamics which could include expected and apparent vessel turn rates and acceleration/deceleration. A simpler solution is illustrated in FIG. 16 using a position estimator 182 which calculates a best estimate of the vessel position at the timestamp of the new message on the basis of the information in the track record 105 and an assumption that the vessel is moving at a constant velocity, with suitable weighting of the information in the track record according to any measures of confidence 147 in that information which are also available in the track record, and a deviation estimator 184 which calculates a measure of deviation between the estimated and newly reported position. This measure of deviation is then scaled according to a deviation standard 186 to yield a position confidence measure 181 ranging from 0.0 to 1.0 (or on another suitable scale) for input to the message evaluator 140.

Figure 17:
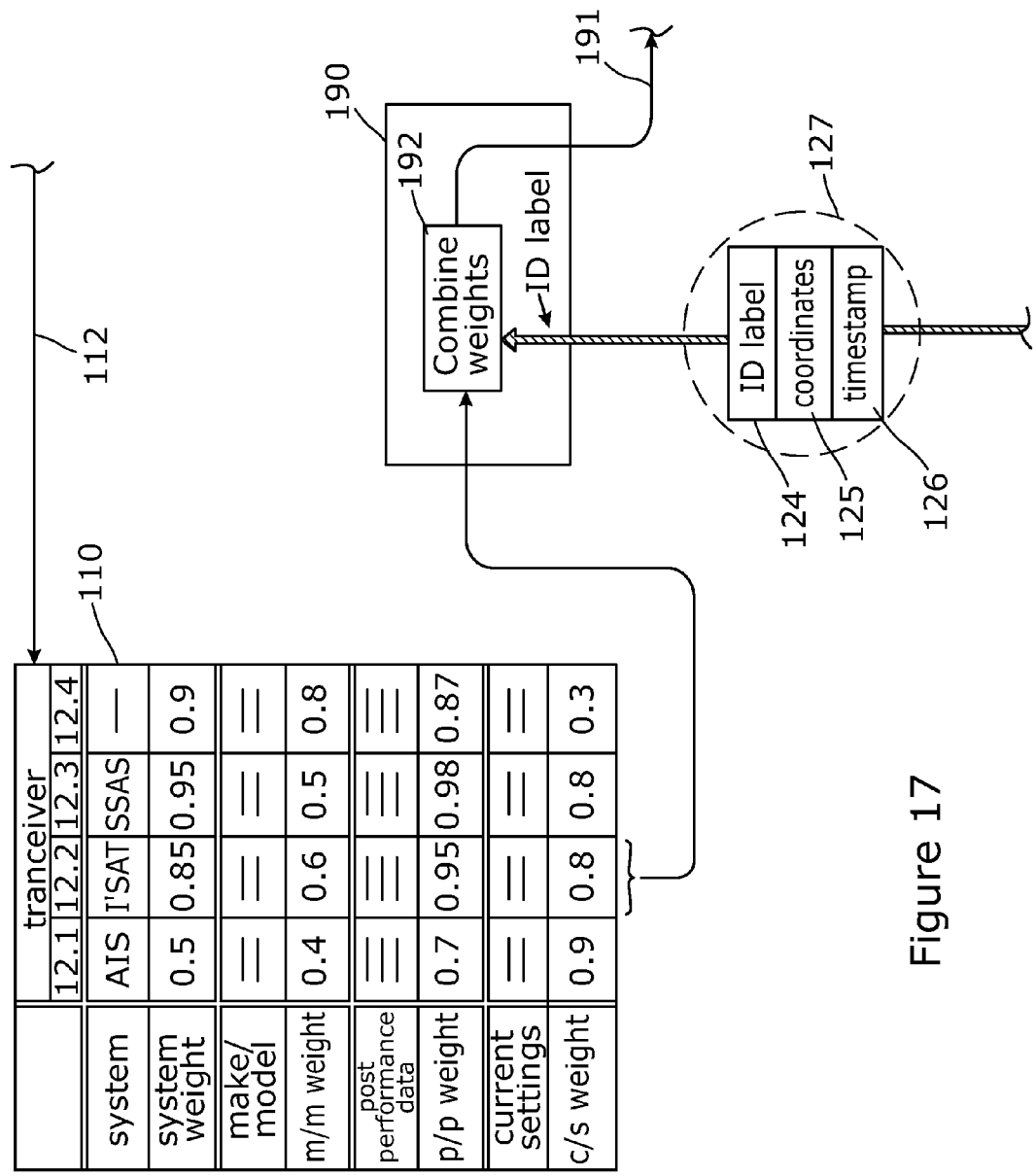
FIG. 17 shows in more detail how the transceiver confidence process of FIG. 14 may be implemented.

An example of how the transceiver confidence function 180 may be implemented, with reference to the track record 105, is presented in FIG. 17. Track record 110 is illustrated as a table with a column for each transceiver 12.1-12.4. Data relating to each transceiver is then grouped into four areas. A first data grouping defines the system classification of the transceiver, for example AIS, Inmarsat-C, SSAS etc. A system weight is then assigned to each transceiver on the basis of this system classification. Note that sometimes more than one transceiver on a particular vessel may of the same system type. The system weights may be assigned to particular systems by the operator of the tracking process or some other party based on past experience, and may be updated periodically either manually or automatically if the need arises.

A second data grouping defines manufacturer and/or supplier and/or model for each transceiver, and a respective make/model weight is assigned to each transceiver on this basis. Again, the make/model weights may be assigned to particular makes and models by the operator of the tracking process or some other party based on past experience, and may be updated periodically either manually or automatically if the need arises.

A third data grouping records specific past performance data for each transceiver, and a performance weight on this basis. The performance data may include or be constructed using, for example: the proportion of coordinate messages received at the tracking process for that transceiver which have been rejected 142, used for the blended track, and/or sent to the revisit buffer; a weighting based on the combined measure of confidence as determined by the message evaluator for messages for that transceiver, over some recent time scale; and a measure of the current frequency or recent average interval between coordinate messages received from a particular transceiver (which could, for example be provided by the message evaluator 140). To this end, transmit record updates 112 are received from the message evaluator 140 and combined into the third data grouping so that the performance weight reflects the unit performance of each particular transceiver.

Other data, such as a number of reset instructions sent to a transceiver, could also be included in the performance weight, and such data could be received from the transceiver control 300.

A fourth data grouping records current settings for the transceiver, for example as received from the transceiver control 300, which could include data such as the current duty cycle or interval between transmissions, and an associated current settings weight is provided for each transceiver.

The transceiver confidence function 190 receives a processed coordinate message 127 (which could be newly received, or after storing in the revisit buffer 144) and uses this to identify a transceiver 12.1-12.4 and retrieve the relevant weights for that transceiver from the transceiver records 110. A combine weights function 192 then generates a combined weight for the transceiver, for example by multiplying together the separate weights from the transceivers record 105 and applying a suitable scaling, to output the required transceiver confidence measure 191 for input to the message evaluator 140.

Figure 18:
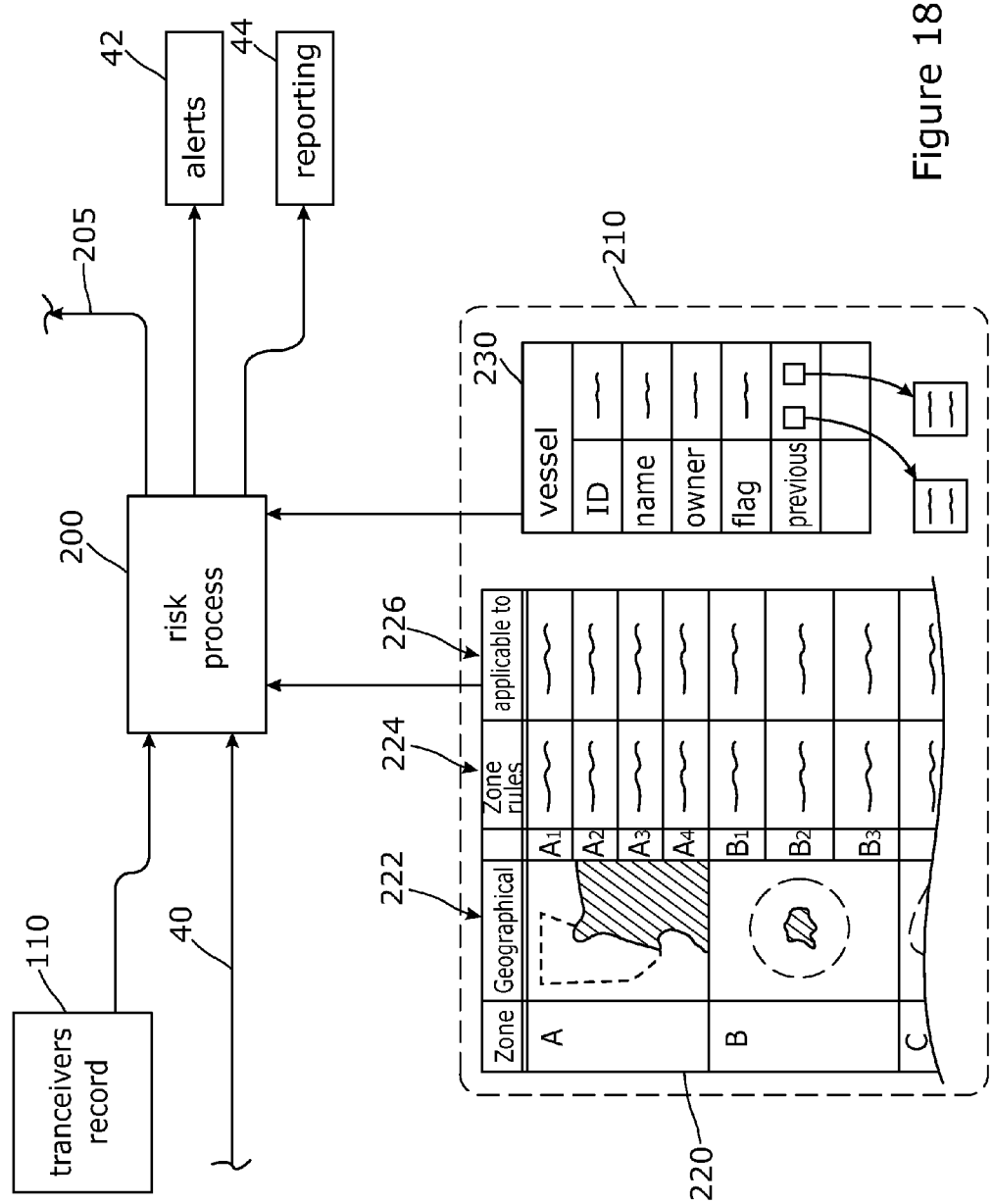
FIG. 18 illustrates in more detail the operation of the risk process of FIG. 13.

An example of how the risk process 200 may be implemented is illustrated in FIG. 18. The risk process 200 is arranged to receive the blended track signal 40 from the position process 100 and to output a risk signal 205 for use by the transceiver control 300 which provides an evaluated assessment of current risks to the vessel for example as a risk signal. The general and specific nature of various risks to the vessel which may be assessed by the risk process 200 are discussed elsewhere in this document, but it is worth noting here that the risk signal could be represented by a single number (for example in the range 0.0 for no risk to 1.0 for maximum risk) which varies over time, or a more complex signal which represents other aspects of the risk or risk related information useful to the transceiver controller 300 such as a minimum currently allowable interval between coordinate message transmissions generally or for particular transceivers or types of transceiver, required operation or turning off of a particular transceiver or transceiver type, alerts which are currently in force due to an assessment by the risk process 200, and so forth.

The risk process is also arranged to output alerts 42 (alerts 566 in FIG. 2) relating to specific risk aspects, and may also be arranged to output reporting data 44 from time to time.

The risk process operates using risk model parameters 210. In FIG. 18 these parameters are represented as risk zone parameters 220 and vessel parameters 230, each illustrated in the figure as tables. The risk zone parameters 220 may form a part of the compliance rules 505 discussed in more detail above in connection with FIGS. 1 to 10. The vessel parameters 230 may be provided by the vessel registry 524 of FIGS. 2 and 3. The zone parameters table comprises data relating to a number of geographical zones labelled here in the first column as A, B, C . . . , and the extent and scope of these geographical zones 222 is defined in the column headed "geographical". These could, for example, define the limits of territorial waters or ports of countries which a vessel should avoid if it is to avoid breaking a sanction or restriction imposed by another government. Associated with each zone are a number of zone rules 224 defined in the column headed "rules". There may be any number of zone rules for a particular zone, and these may indicate a particular way in which the risk signal will be affected by a vessel, depending on a temporal and/or spatial relationship between the blended track 40 and the geographical zone, and/or how alerts should be generated depending on a temporal and/or spatial relationship between the blended track 40 and the geographical zone. The rules may also take into account various other data as discussed below.

Because the risk to a vessel may depend on the vessel itself, for example upon its country of registration, flag, size, cargo and so forth, such data about the vessel is provided in vessel parameters 230. These vessel parameters may be found, for example, in the vessel registry 524 illustrated in FIGS. 2 and 3. The data illustrated here in FIG. 18 includes a vessel ID code for internal use by the tracking process 30, a vessel name, one or more vessel owners and optionally nationality data for the owners, a vessel flag (country of registration), and pointers to other vessel data, for example to previous values of such data, previous voyage tracks for the vessel and so forth (noting that a restriction on shipping traffic may apply depending on previous ownership, previous voyages and similar).

The zone parameters therefore also include, in respect of each rule, an "applicable to" column which typically relates to the vessel parameters 230, for example specifying that a particular rule applies only to ships that are or have been registered in the Americas, or does not apply to ships that are registered in a particular group of countries.

The zone rules 224 may also included dependencies on the current and past status and performance of the transceivers 12.1-12.4 on board the vessel, for example as represented by transceivers record 120. For example, a rule could specify a higher risk if only a lower performance transceiver is currently operational, or if the transmission repeat rate of the transceivers is all below a certain threshold.

Some example geographical zones and associated rules are as follows:

(a) (i) Geographical zone=territorial waters of countries x, y, z;

(ii) Risk signal=at least 0.5 if vessel within 300 km and vessel not registered or owned in countries v, w, x, y, z;
(iii) Risk signal=at least 0.7 if vessel enters zone and vessel not registered or owned in countries v, w, x, y, z;
(iii) output orange alert if (ii) applies;
(iv) output red alert if (iii) applies.
(b) (i) Geographical zone={area defined by coordinates}
(ii) Risk signal=at least 0.7 if AIS transceiver is on;
(iii) Risk signal=at least 0.75 if no transceiver of type P or Q is transmitting more frequently than every 600 seconds;
(iv) Risk signal=at least 0.75 if any operating transceiver has performance weighting of less than 0.6
(v) output orange alert if (ii) or (iii) applies.
(c) (i) Geographical zone={area defined by coordinates in combination with territorial waters of countries x, y};
(ii) Required transmission frequency of at least one transceiver=at least every 3600 seconds;
(iii) Required turning off of any transceiver of system R;
(iv) Risk signal=at least 1.0 minus the lowest performance weighting of operating transceivers of systems P or Q.

Some rules held within the risk model parameters may be independent of vessel track, for example depending only on vessel parameters 230, for example:
(d) (i) Risk signal=at least 0.6 if flag (registration country) any of D, E or F;
(ii) Output orange alert if (i) applies It will be seen that, under rule (d), an orange alert is issued if the registration country of a vessel changes to certain countries, irrespective of where the vessel is actually located at the time of the change. Note that vessel ownership and other parameters relating to the vessel or relating to legal constraints and rules may change during a voyage, giving rise to changes in the risk signal 205 and alerts 42.

The geographical zones 22 defined in the risk model parameters may also include one or more core zones each associated with one or more adjacent buffer zones which are peripheral to a core zone. Proximity to, heading towards or transition into a core zone may then give rise to one set of actions such as or including alerts defined by the zone rules 224, and proximity to, heading towards or transition into a buffer zone may then give rise to a different set of actions such as or including alerts defined by the zone rules 224. By way of example, the following two geographical zones and rules are associated as a buffer zone and a core zone:
(e) (i) Geographical zone=within 100 km of territorial waters of countries H, I, J;
(ii) if (i) then risk signal=at least 0.5;
(iii) if heading and speed indicate expected entry into zone defined in (i) in less than 3 hours then issue orange alert.
(f) (i) Geographical zone=within territorial waters of countries H, I or J;
(ii) if (i) then risk signal=at least 0.9
(iii) if heading and speed indicate expected exit from zone defined in (i) within less than 3 hours then issue orange alert
(iv) if not (iii) then issue red alert The risk process may assess the rules of the risk zone parameters 220 using the blended track simply from the current position of the vessel according to the blended track, for example as illustrated in (a) above, and may also take account of the direction and/or speed of the vessel.

Figure 19:
FIG. 19 illustrates an alert report which may be output by the risk process of FIG. 18.

FIG. 19 illustrates an alert display showing a series of alerts generated by the tracking process 30 for a particular vessel over a period of time before and during a voyage. This alert display could be accessed, for example, from the user interface display of FIG. 10 in respect of a particular vessel being monitored by the voyage monitoring function 540. The alert display may be presented to a client 48 or on an operator display 46 as shown in FIG. 1 or 11. A display title refers to the name of the vessel being tracked. A scroll bar on the left can be used to see earlier and later alerts. At least some of the alerts are generated by the risk process 200 as discussed above. Each alert shown may have a colour status (red, orange, green or similar) and be coloured appropriately on the display. In particular, the central alert in FIG. 19 states "Ship Entered War Risk Zone". This could be, for example, an orange alert based on a blended track 40 indicating the vessel entering a geographical zone defined in the geographical zones column 222 of the risk zone parameters 220, with the alert being triggered by a zone rule 224 along the lines of those discussed above.

Data generated by the risk model may be output for future use and reference in the form of a reporting output 44 which may also include details of the blended track 40, and may be kept in an electronic log and/or may be printed if required. Such reports may correspond to the compliance reports 555 already shown in FIG. 1 and discussed in the corresponding text above. Such reports may be important for demonstrating compliance with shipping regulations and rules issued by various national and international organisations. An example of such a report is given in FIG. 20, in which the blended track 40 of a ship GEORGITSI, registered in the Marshall Islands, is shown passing through the Baltic, along with various notifications relating to times of departure, approach and arrival at various ports. This display could be accessed, for example, from the "archive" tab shown in the interface aspect of FIGS. 5 and 10.

Figure 21:
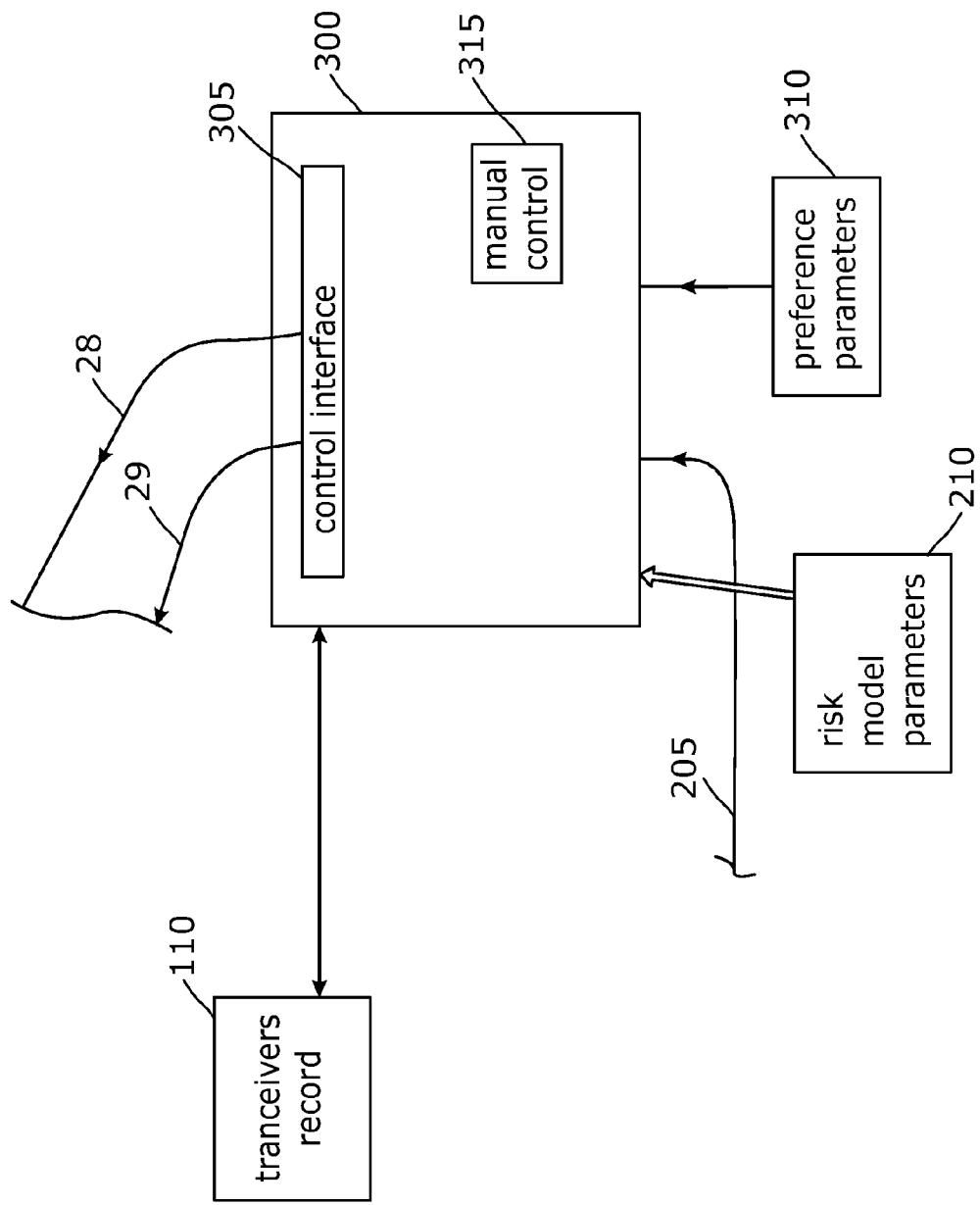
FIG. 21 shows in more detail how the transceiver control of FIG. 13 may be implemented.

An example of how the transceiver control process 300 may be implemented is shown schematically in FIG. 21. The transceiver control process 300 includes a control interface 305 which is adapted to communicate with the data handling services 18, or optionally more directly with one or more of the transceivers 12.1-12.4 on board the vessel, to control various aspects of their operation. Aspects of operation which may be controlled will vary between transceiver types, but could include an ability to reset a transceiver (for example if the transceiver record 110 indicates poor performance or lack of coordinate messages altogether), to change the transmit frequency of a transceiver, request a current position for example as a "real time" coordinate message, set reporting parameters (for example to send a coordinate message at intervals by time or distance such as every hour, or every kilometre). Control operations are reflected by sending relevant data regarding the current control state and control actions to the transceivers record 110.

The transceiver control process 300 also includes a manual control 315 to enable an operator of the tracking process 30 to directly control aspects of the transceivers, for example to send a reset signal to a transceiver or to turn off an AIS transceiver to reduce security risk in an area of high piracy risk.

The transceiver control process 300 operates with reference to the transceivers record 110 (and also passes information on new control instructions to that record), the risk model parameters 210, and the transceiver control preferences 310, which may reflect various issues relating to technological differences between the transceiver types for example as discussed in connection with FIG. 12). The transceivers record 110 and the risk model parameters 210 have already been described above. The transceiver control preference parameters 310 may specify, for example, the monetary cost of using particular ones of transceivers 12.1-

12.4 at particular repeat rates or duty cycles, and the current risk/monetary cost balance required or to be targeted by the tracking process 30. A simple group of rules for the current risk/monetary cost balance could be:

(a) If one or more transceiver control measures can either prevent a red alert or keep the risk measure below 0.8 then effect the combination of measures that achieves this at lowest cost;

(b) If one or more transceiver control measures can prevent an orange alert or keep the risk measure below 0.6 then effect the combination of measures that achieves this at lowest cost if the cost is less than US$ x per hour;

(c) If no alert condition is applicable to the current position then spend US$ y per hour extra if it achieves a risk reduction of z;

(d) The total performance weights of the operating transceivers must be at least 0.6 at any time;

(e) The costs of operation of transceiver (12.1) is US$ a for each day or part thereof;

(f) The costs of each position transmission for transceivers (12.2)-(12.4) respectively is US$ b, US$ c, US$ d;

(g) If risk measure greater than 0.8 then use only secure transceivers (12.3).

The transceiver control process 300 is able to judge which transceiver control measures to implement to achieve the results required by the transceiver control preferences 310 because it also has access to the risk model parameters, and to the transceivers record 110 which contains data such as performance weights for each transceiver which may be required to evaluate risk model rules. Performance weights and other data relating to performance of the transceivers may also be taken directly into account by the transceiver control preferences.

Typically, only a few rules from the risk model parameters are likely to be in operation at anyone time, because of the geographical and vessel based limitations of these rules, so that a "brute force" search through applicable rules to establish currently required different transceiver control operations may be practical. However, heuristics and other rules for reducing the computational cost of determining optimum or reasonable transceiver control measures for effecting the transceiver control preferences 310 may be used.

Figure 22:
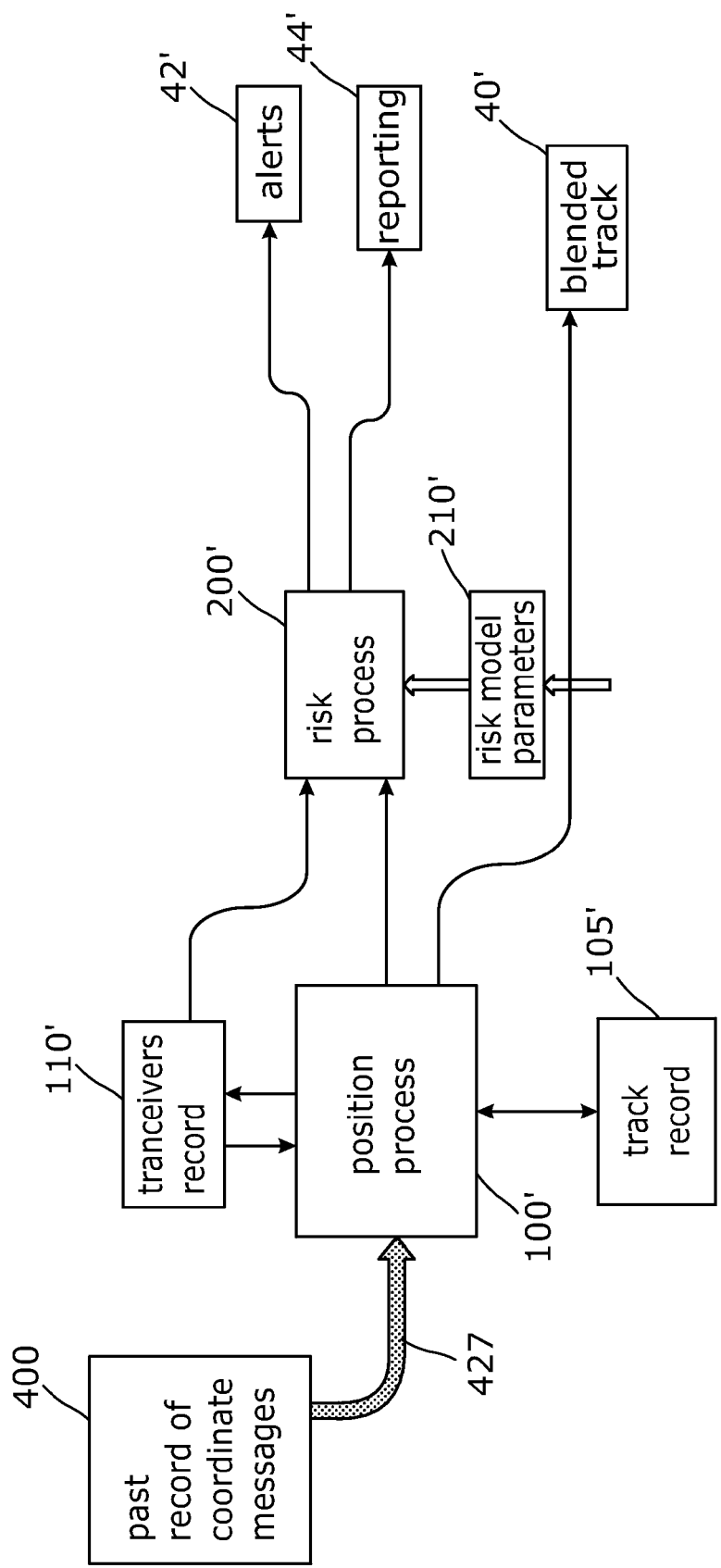
FIG. 22 shows use of the described apparatus and methods for analysing a past voyage.

FIG. 22 illustrates how part or all of the system as described above may be provided and/or used regarding a voyage or part of a voyage of a vessel 10 that has already taken place. Note that various other combinations of different aspects of the methods and apparatus already described, which are different to the combination shown in FIG. 22, may also be used regarding a past voyage.

Application of the already described techniques to a past voyage may be beneficial for a number of reasons. It may be desirable to prime the transceivers record 110 with relevant data and weights before the start of a new voyage of the same vessel, especially the performance weights which are based at least in part on the combined confidence measure or other assessment by the message evaluator 140. Some rules of the risk model parameters may depend on previous locations and positions of the vessel over recent months or years, for example causing alerts or changes in the risk signal depending on earlier tracks. It may be desirable to analyse a previous voyage or part of a voyage to determine any alerts which would or should have been generated, and/or to produce a reporting output 44 for that previous voyage, for example to flag up vessel entry into a high risk port.

FIG. 22 therefore shows use of the tracking process of FIG. 13, but with the contemporary stream of coordinate messages being replaced with historic data 400 from the past voyage or part of a past voyage to be assessed. This data is passed as coordinate messages 427 to a position process 110' operating in essentially the same was as position process 110 described above in conjunction with a corresponding risk process 200' to generate a blended track 40', alerts 42' and reporting output 44' as required, and to build or prime the transceivers record 110' with suitable data which may be used to start the tracking process for a new voyage of the same vessel. FIG. 22 also shows a corresponding track record 105' based on the historic coordinate messages 427.

FIG. 22 omits the transceiver control process of FIG. 13, since the voyage has already taken place so no transceiver control is possible. However, if desired similar functionality could be included to assess what transceiver control might have been desirable or provided by the system, or what transceiver system costs might have been incurred.

The risk model parameters in FIG. 22 are labelled using numeral 210' to indicate some likely differences to the corresponding operational parameters 210 of FIG. 13. This is because it will likely be desirable to run the system on a historic voyage using risk model parameters, including for example governmental rules and regulations regarding shipping traffic, properties of the vessel and so forth which were in force at the time of that previous voyage, and not those that are in force at the time of the later assessment.

Although particular detail embodiments have been described, it will be apparent to the skilled person that various adaptations and modifications can be made without departing from the scope of the invention as defined in the claims.

The invention claimed is:

1. A computer-implemented method of reporting to a user non-compliance of a vessel with a plurality of compliance rules, comprising:

screening a vessel by assessing compliance of the vessel with at least some of said compliance rules without reference to a current track of the vessel, and reporting resulting compliance issues to the user;

monitoring, after completing the step of screening, compliance of the vessel in conjunction with a current track of the vessel, with at least some of said compliance rules, and reporting resulting compliance issues to the user;

providing the user with access to a screening function for carrying out the screening step;

permitting selection by the user of a screened vessel for voyage monitoring; and providing the user with access to a monitoring function for carrying out the monitoring step, and for reporting resulting compliance issues to the user.

2. The method of claim 1 further comprising generating a compliance report, after completing the step of monitoring, the compliance report comprising the compliance issues reported to the user.

3. A method of tracking a vessel having a plurality of transceivers located on board the vessel, the method comprising:

receiving a stream of coordinate messages, each coordinate message defining a geographical position of the vessel and indicating that the message originates from a particular one of one of the transceivers;

assigning a confidence level to each coordinate message dependent on at least one of: the identity of the indicated transceiver, and the geographical position defined by the message; and generating a track of the vessel based on the defined geographical positions and the confidence levels assigned to the associated coordinate messages.

4. The method of claim 3 wherein assigning a confidence level to a said coordinate message dependent on at least the geographical position defined by the message comprises assigning a confidence level dependent on a relationship between the geographical position defined by the coordinate message and geographical positions defined by a plurality of previous ones of said coordinate messages.

5. The method of claim 3 wherein assigning a confidence level to a said coordinate message dependent on at least the identity of the indicated transceiver comprises assigning a confidence level dependent on a measure of past performance of the indicated transceiver.

6. The method of claim 5 wherein the measure of past performance of the indicated transceiver is dependent upon confidence levels assigned to previous coordinate messages indicated as received from the same transceiver.

7. The method of claim 3, wherein generating a track of the vessel comprises generating the track of the vessel using geographical positions only from coordinate messages selected according to the assigned confidence levels.

8. The method of claim 3, wherein the track of the vessel comprises position of the vessel dependent upon time, and optionally one or more of velocity of the vessel dependent upon time and acceleration of the vessel dependent upon time.

9. The method of claim 3, further comprising deferring use of a first coordinate message representing an earlier geographical position in generating the track until a second coordinate message representing a later geographical position has been received.

10. The method of claim 9 wherein the first coordinate message indicates an identity of a first type of transceiver, the second coordinate message indicates an identity of a second type of transceiver different to the first type of transceiver.

11. The method of claim 3, wherein at least two of the plurality of transceivers are of different types.

12. The method of claim 11 wherein at least one of the transceivers is an AIS type transceiver, and at least one of the transceivers is not an AIS transceiver.

13. The method of claim 12 wherein one of the transceivers which is not an AIS receiver is a transceiver operating through geostationary satellites.

14. The method of claim 3 wherein the vessel is a ship and the method is carried out remotely from the ship.

15. The method of claim 14 wherein the generated track is a blended track of the ship generated by combining at least some of the defined geographical positions from each of the plurality of transceivers.

16. A method of tracking a vessel having a plurality of transceivers located on board the vessel, the method comprising:

receiving a stream of coordinate messages, each coordinate message defining a geographical position of the vessel and indicating that the message originates from a particular one of one of the transceivers;

generating a track of the vessel using at least some of said coordinate messages;

generating at least one measure of performance of at least one of said transceivers dependent upon said received coordinate messages; and controlling at least one of the transceivers in a manner dependent upon the at least one measure of performance.

17. The method of claim 16 wherein at least one said measure of performance of a particular transceiver is dependent upon a frequency of received coordinate messages which are indicated as originating from that transceiver.

18. The method of claim 16 wherein at least one said measure of performance of a particular transceiver is dependent geographical positions defined in coordinate messages indicated as received from that transceiver.

19. The method of claim 16, further comprising defining financial costs associated with operating one or more of said transceivers, and the step of controlling comprises controlling at least one of the transceivers in a manner dependent upon said financial costs.

20. The method of claim 16, further comprising defining a risk model wherein a measure of risk to the vessel is dependent at least upon position of the vessel with respect to a plurality of geographical zones, and controlling at least one of said transceivers is also carried out dependent upon risk to the vessel according to the risk model evaluated using the track of the vessel in respect of said position.

21. The method of claim 16, wherein the step of controlling comprises sending an instruction to change the interval between transmissions of coordinate messages of a selected one of said transceivers.

22. The method of claim 16, wherein the step of controlling comprises sending an instruction to stop and/or start transmission of coordinate messages by a selected one of said transceivers.

23. The method of claim 16, wherein the step of controlling comprises sending an instruction to restart a selected one of said transceivers.

24. The method of claim 16, wherein controlling at least one of the transceivers comprises controlling a plurality of said transceivers.

25. The method of claim 16 wherein at least two of the plurality of transceivers are of different types.

26. The method of claim 25 wherein at least one of the transceivers is an AIS type transceiver, and at least one of the transceivers is not an AIS transceiver.

27. A method of tracking a vessel having a plurality of transceivers located on board the vessel, the method comprising:

receiving a stream of coordinate messages, each coordinate message defining a geographical position of the vessel and indicating that the message originates from a particular one of one of the transceivers;

generating a track of the vessel using at least some of said coordinate messages;

defining a risk model wherein risk to the vessel is dependent at least upon position of the vessel with respect to a plurality of geographical zones;

generating alerts dependent on risk to the vessel assessed using the model in conjunction with the generated track of the vessel in respect of said geographical position.

28. The method of claim 27 wherein the track of the vessel comprises position of the vessel, and optionally one or more of velocity of the vessel and acceleration of the vessel, and risk to the vessel is dependent upon one or more of position, velocity and acceleration of the vessel according to the track.

29. The method of claim 27 wherein the risk model comprises a plurality of said geographical zones defined as core zones, and one or more of said geographical zones defined as buffer zones which are peripheral to ones of said core zones, the risk model defining changes of risk in respect of a vessel transitioning into a said buffer zone and in respect of a vessel transitioning into a said core zone, said changes or risk being associated with a said generation of respective alerts.

30. The method of claim 27, wherein the risk to the vessel according to the risk model is also dependent upon one or more performance measures of the one or more transceivers.

31. The method of claim 27, wherein the risk model is defined such that risk to the vessel is also dependent upon legal status of the vessel including one or more of: the flag/country of registration of the vessel, the owner of the vessel, and prior values of the above.

32. A method of analyzing a past voyage of a vessel having a plurality of transceivers located on board the vessel, the method comprising:
 storing a plurality of coordinate messages transmitted by said transceivers during the past voyage, each coordinate message defining a geographical position of the vessel during the past voyage and indicating that the message originated from a particular one of one of the transceivers; and
 generating a track of the vessel during the past voyage using the defined geographical positions.

33. The method of claim 32 further comprising assigning a confidence level to each stored coordinate message dependent on at least one of: the identity of the indicated transceiver, and the geographical position defined by the message; and
 generating the track of the vessel based on the defined geographical positions and the confidence levels assigned to the associated coordinate messages.

34. The method of claim 32 comprising defining a risk model relevant to the past voyage wherein the modelled risk to the vessel is dependent at least upon position of the vessel with respect to a plurality of geographical zones;
 forming alerts which would have been relevant to the vessel during the past voyage according to risk to the vessel assessed using the risk model in conjunction with the generated track of the vessel.

35. Apparatus for tracking a vessel having a plurality of transceivers located on board the vessel, the apparatus comprising elements for:
 receiving a stream of coordinate messages, each coordinate message defining a geographical position of the vessel and indicating that the message originates from a particular one of one of the transceivers;
 assigning a confidence level to each coordinate message dependent on at least one of: the identity of the indicated transceiver, and the geographical position defined by the message; and
 generating a track of the vessel based on the defined geographical positions and the confidence levels assigned to the associated coordinate messages.

36. The apparatus of claim 35, further comprising:
 an element for generating at least one measure of performance of at least one of said transceivers dependent upon said received coordinate messages; and
 an element for controlling at least one of the transceivers in a manner dependent upon the at least one measure of performance.

37. The apparatus of claim 36 wherein at least one said measure of performance of a particular transceiver is dependent upon a frequency of received coordinate messages which are indicated as originating from the transceiver.

38. The apparatus if claim 36 wherein at least one said measure of performance of a particular transceiver is dependent geographical positions defined in coordinate messages indicated as received from that transceiver.

39. The apparatus of claim 36 wherein the element for controlling at least one of the transceiver is arranged to control the at least one of the transceiver in a manner dependent upon defined financial costs associated with operating one or more of the transceivers.

40. The apparatus of claim 36 wherein the element for controlling at least one of the transceivers is arranged to send an instruction to change the interval between transmissions of coordinate messages of a said transceiver dependent upon the at least one measure of performance of said transceiver.

41. The apparatus of claim 36 wherein the element for controlling at least one of the transceivers is arranged to send an instructions to stop and/or start transmission of coordinate messages by a selected one of said transceivers.

42. The apparatus of claim 36 wherein the element for controlling at least one of the transceivers is arranged to send an instruction to restart a selected one of said transceivers.

43. The apparatus of claim 35, further comprising:
 a risk model wherein risk to the vessel is dependent at least upon position of the vessel with respect to a plurality of geographical zones; and
 an element for generating alerts dependent on risk to the vessel assessed using the model in conjunction with the generated track of the vessel in respect of said geographical position.

44. The apparatus of claim 35, further comprising a vessel having the plurality of transceivers located on board the vessel.

45. The apparatus of claim 44 wherein at least two of the transceivers are of different type to each other.

46. The apparatus of claim 44 wherein at least one of the transceivers is an AIS type transceiver, and at least one of the transceivers is not an AIS transceiver.

47. The apparatus of claim 35 wherein assigning a confidence level to a said coordinate message dependent on at least the geographical position defined by the message comprises assigning a confidence level dependent on a relationship between the geographical position defined by the coordinate message and geographical positions defined by a plurality of previous ones of said coordinate messages.

48. The apparatus of claim 35 wherein assigning a confidence level to a said coordinate message dependent on at least the identity of the indicated transceiver comprises assigning a confidence level dependent on a measure of past performance of the indicated transceiver.

49. The apparatus of claim 48 wherein the measure of past performance of the indicated transceiver is dependent upon confidence levels assigned to previous coordinate messages indicated as received from the same transceiver.

50. The apparatus of claim 35 wherein generating a track of the vessel comprises generating the track of the vessel using geographical positions only from coordinate messages selected according to the assigned confidence levels.

51. The apparatus of claim 35 wherein the track of the vessel comprises position of the vessel dependent upon time, and optionally one or more of velocity of the vessel dependent upon time and acceleration of the vessel dependent upon time.

52. The apparatus of claim 35 further comprising deferring use of a first coordinate message representing an earlier geographical position in generating the track until a second coordinate message representing a later geographical position has been received.

53. The apparatus of claim 35 wherein the first coordinate message indicates an identity of a first type of transceiver, the second coordinate message indicates an identity of a second type of transceiver different to the first type of transceiver.

\* \* \* \* \*